(12) United States Patent
Holtcamp et al.

(10) Patent No.: US 8,557,902 B2
(45) Date of Patent: Oct. 15, 2013

(54) FUNCTIONALIZABLE SYNTHETIC HYDROCARBON FLUIDS AND INTEGRATED METHOD FOR PRODUCTION THEREOF

(75) Inventors: Matthew W. Holtcamp, Huffman, TX (US); John R. Hagadorn, Houston, TX (US); Matthew S. Bedoya, Humble, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 255 days.

(21) Appl. No.: 13/209,215

(22) Filed: Aug. 12, 2011

(65) Prior Publication Data

US 2012/0053309 A1 Mar. 1, 2012

Related U.S. Application Data

(60) Provisional application No. 61/376,925, filed on Aug. 25, 2010.

(51) Int. Cl.
*C08L 91/00* (2006.01)
*B01J 19/18* (2006.01)

(52) U.S. Cl.
USPC .......................................... 524/313; 422/134

(58) Field of Classification Search
USPC ....................................................... 524/313
See application file for complete search history.

(56) References Cited

U.S. PATENT DOCUMENTS

| | | |
|---|---|---|
| 3,149,178 A | 9/1964 | Hamilton et al. |
| 3,382,291 A | 5/1968 | Brennan |
| 3,742,082 A | 6/1973 | Brennan |
| 3,780,128 A | 12/1973 | Shubkin |
| 3,833,678 A | 9/1974 | Brennan |
| 3,997,621 A | 12/1976 | Brennan |
| 4,172,855 A | 10/1979 | Shubkin et al. |
| 4,545,941 A | 10/1985 | Rosenburg |
| 4,704,491 A | 11/1987 | Tsutsui et al. |
| 4,956,122 A | 9/1990 | Watts et al. |
| 5,087,788 A | 2/1992 | Wu |
| 5,688,887 A | 11/1997 | Bagheri et al. |
| 5,696,213 A | 12/1997 | Schiffino et al. |
| 5,859,159 A | 1/1999 | Rossi et al. |
| 6,022,929 A | 2/2000 | Chen et al. |
| 6,043,401 A | 3/2000 | Bagheri et al. |
| 6,133,209 A | 10/2000 | Rath et al. |
| 6,410,812 B1 | 6/2002 | Hope et al. |
| 6,414,090 B2 | 7/2002 | Minami et al. |
| 6,414,091 B2 | 7/2002 | Moritomi et al. |
| 6,548,724 B2 | 4/2003 | Bagheri et al. |
| 6,706,828 B2 | 3/2004 | DiMaio |
| 6,713,438 B1 | 3/2004 | Baillargeon et al. |
| 6,949,688 B2 | 9/2005 | Goze et al. |
| 7,037,989 B2 | 5/2006 | Kacker et al. |
| 2007/0179307 A1 | 8/2007 | Olivier-Bourbigou et al. |
| 2010/0160506 A1* | 6/2010 | Wu et al. ................ 524/114 |

FOREIGN PATENT DOCUMENTS

| | | |
|---|---|---|
| EP | 0 273 654 | 2/1994 |
| EP | 0 613 873 | 9/1994 |
| EP | 1 323 749 | 7/2003 |
| WO | WO 96/23751 | 8/1996 |
| WO | WO 99/67347 | 12/1999 |
| WO | WO 02/14384 | 2/2002 |
| WO | WO 03/020856 | 3/2003 |
| WO | WO 2007/011462 | 1/2007 |
| WO | WO 2007/111776 | 10/2007 |

OTHER PUBLICATIONS

Ahmad et al., "*Co-Metathesis Reaction of Crude Palm Oil and Ethene*", Journal of the American Oil Chemists' Society, 1995, vol. 72, No. 6, pp. 757-758.

* cited by examiner

*Primary Examiner* — Hui Chin

(57) ABSTRACT

This invention relates to a process to produce a poly(alpha-olefin)(alpha, internally unsaturated, nonconjugated olefin) comprising: contacting at least one renewable feedstream with at least one lower olefin in the presence of a metathesis catalyst, wherein a mixture of at least one $C_4$ to $C_{40}$ linear alpha-olefin and at least one alpha, internally unsaturated, nonconjugated olefin is produced; and contacting the mixture with a metallocene catalyst system, wherein a poly(alpha-olefin)(alpha, internally unsaturated, nonconjugated olefin) is produced.

16 Claims, 4 Drawing Sheets

FIGURE 1: Structures of Useful Fatty Acids Found In Natural Oils
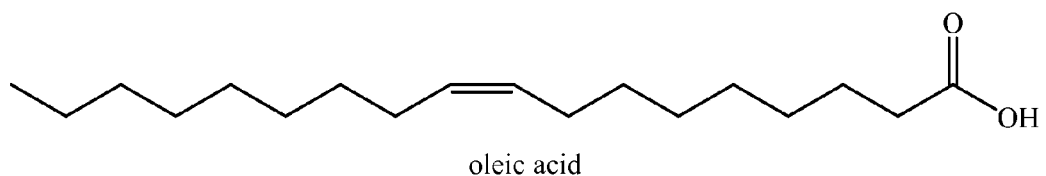
oleic acid
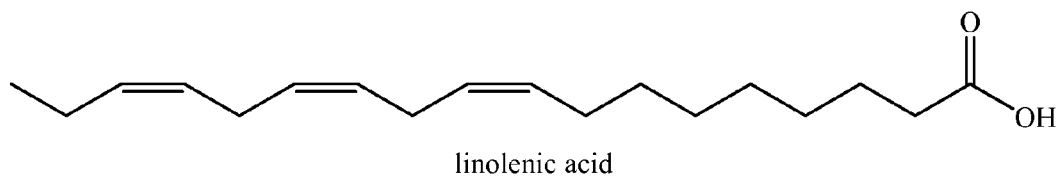
linolenic acid
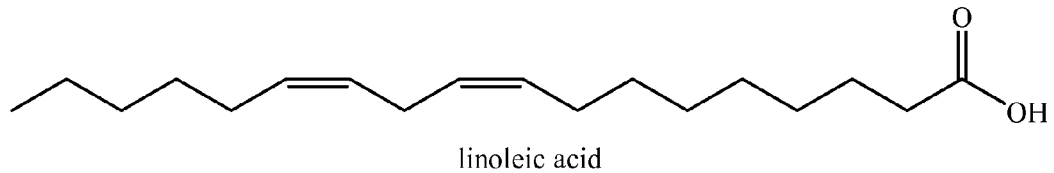
linoleic acid
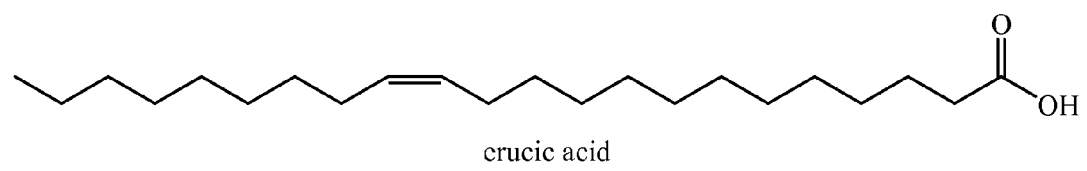
erucic acid

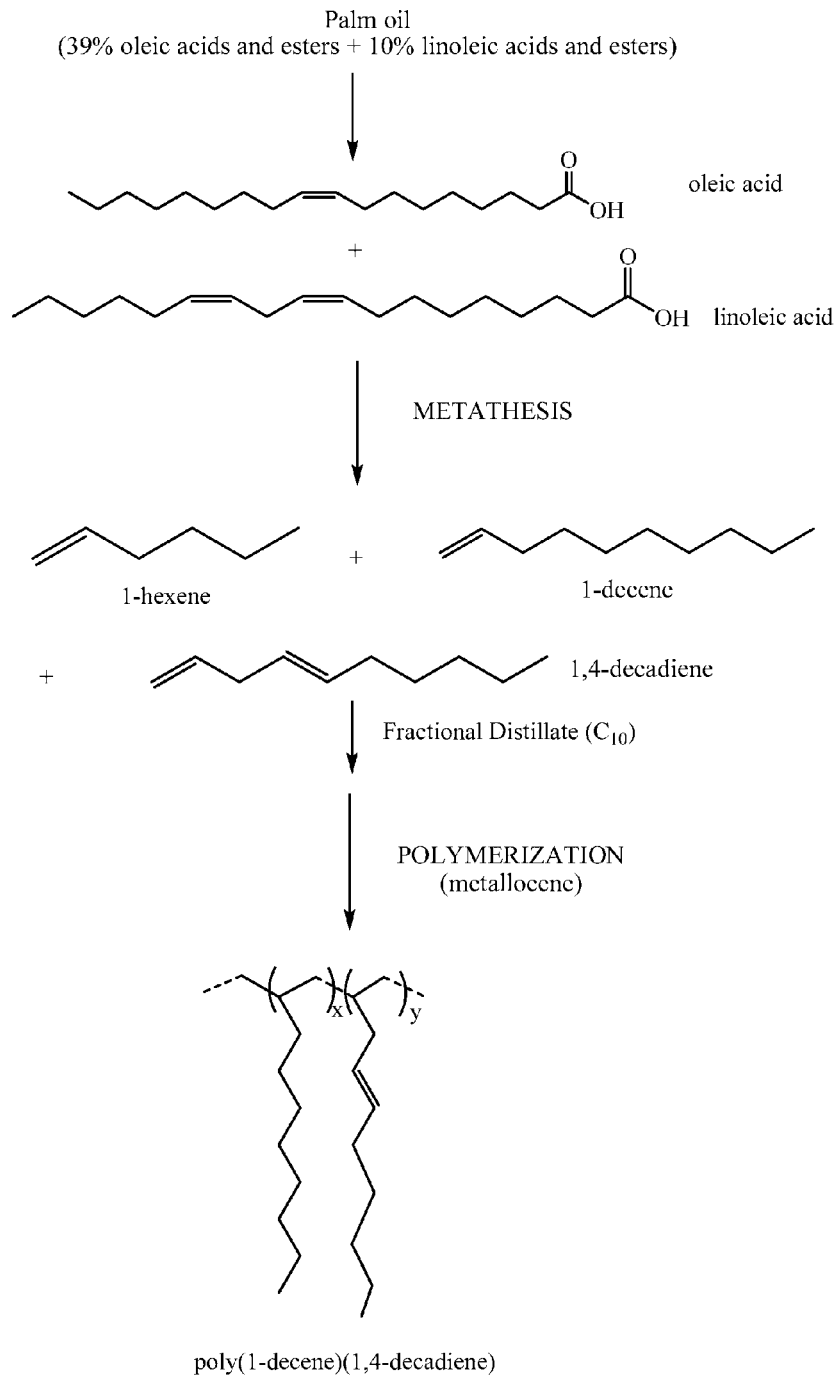
FIGURE 2: Exemplary Integrated Process of Producing Poly(1-decene)(1,4-decadiene) From Renewable Sources

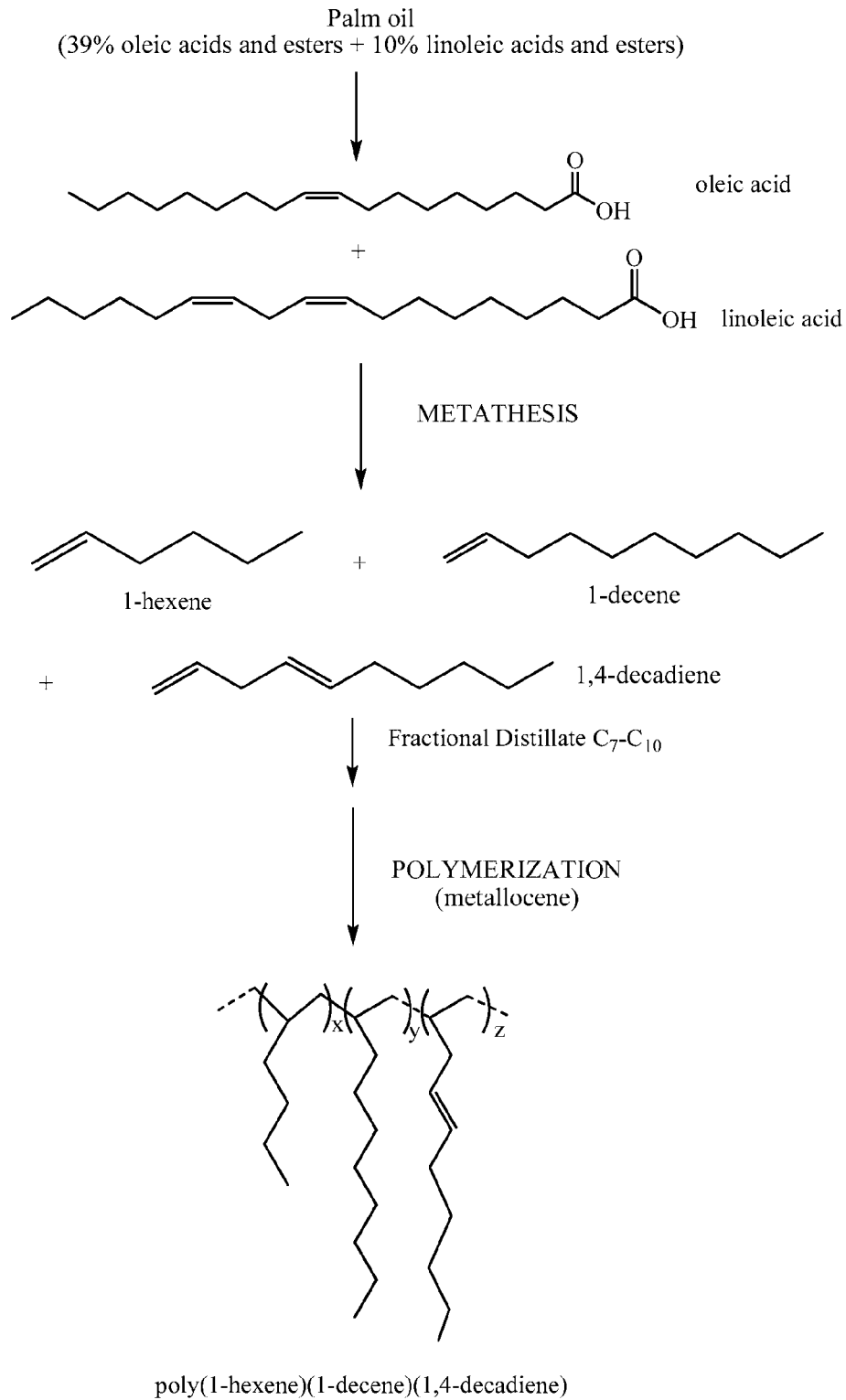
FIGURE 3: Exemplary Integrated Process of Producing Poly(1-decene)(1-hexene)(1,4-decadiene) From Renewable Sources

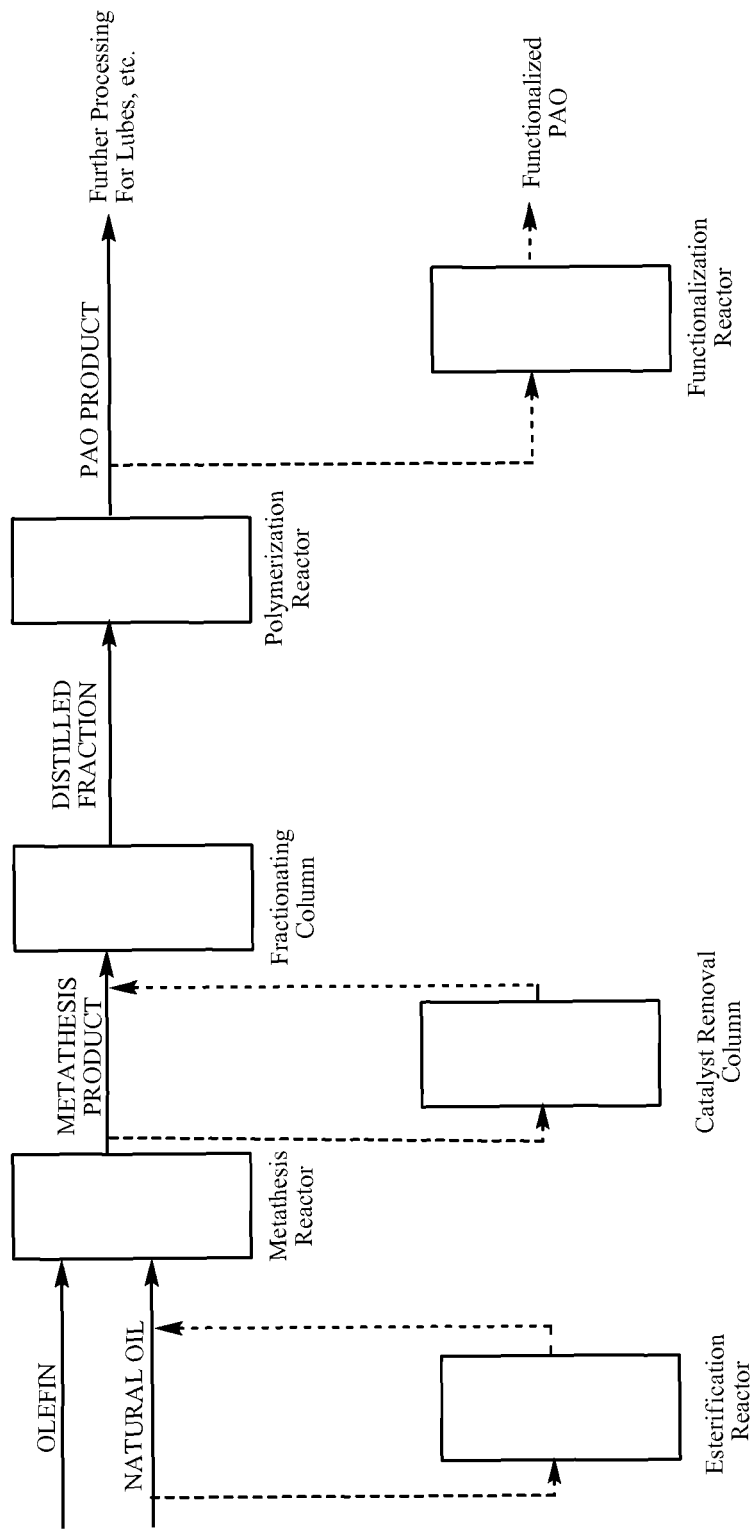
FIGURE 4: Integrated System For The Production Of PAOs

FUNCTIONALIZABLE SYNTHETIC HYDROCARBON FLUIDS AND INTEGRATED METHOD FOR PRODUCTION THEREOF

PRIORITY CLAIM

This application claims priority to and the benefit of U.S. Ser. No. 61/376,925, filed Aug. 25, 2010, the disclosure of which is incorporated herein by reference in its entirety.

STATEMENT OF RELATED CASES

This application relates to U.S. Ser. No. 12/143,663, filed on Jun. 20, 2008; U.S. Ser. No. 12/487,739, filed on Jun. 19, 2009; U.S. Ser. No. 12/488,066, filed on Jun. 19, 2009; U.S. Ser. No. 12/488,093, filed on Jun. 19, 2009; U.S. Ser. No. 61/259,514, filed on Nov. 9, 2009; U.S. Ser. No. 61/259,521, filed on Nov. 9, 2009; U.S. Ser. No. 12/705,136, filed on Feb. 12, 2010; U.S. Ser. No. 61/314,388, filed on Mar. 16, 2010; U.S. Ser. No. 61/203,523, filed on Dec. 23, 2008; U.S. Ser. No. 12/660,815, filed on Mar. 4, 2010; and U.S. Ser. No. 61/025,076, filed on Jan. 31, 2008.

FIELD OF THE INVENTION

This invention relates to a method of producing poly(alphaolefin)(alpha, internally unsaturated non-conjugated olefin)s from feedstreams comprising a mixture of linear alpha-olefins and alpha, internally unsaturated non-conjugated olefins, and to the use of the poly(alphaolefin)(alpha, internally unsaturated non-conjugated olefin)s and derivatives thereof as novel synthetic hydrocarbon fluids, plasticizers, and synthetic lubricant base stocks.

BACKGROUND OF THE INVENTION

Linear alpha-olefins (LAOS) find application in a wide variety of end uses including intermediates in the production of polyalphaolefins (PAOs), fine chemicals, epoxides, amines, oxo alcohols, synthetic lubricants, synthetic fatty acids, alkylated aromatics, synthetic lubricants, surfactant intermediates, base oil for synthetic drilling fluids, and as lubricant additives. LAOs of industrial interest include 1-butene, 1-hexene, and 1-octene to 1-tetradecene, with 1-decene being a commonly used material.

The two main commercial routes to LAOs are the oligomerization of ethylene and the Fischer-Tropsch process which converts carbon monoxide and hydrogen into liquid hydrocarbons. The major source of the starting materials for these commercial routes to LAOs are nonrenewable feedstreams including petroleum, coal, and natural gas. Recently there has been a strong incentive to produce fuels and chemical products from renewable feedstreams such as natural oils. For example, the development of biodiesel fuels is of great interest and some biodiesel-based materials are already commercially produced. Specifically, bio-diesel fuels made from plant oils are already on the market and demand for such fuels is expected to increase significantly over the next decade. To support this increased demand, a large amount of natural oils and ethanol is expected to become available.

LAOs may be produced from such renewable feedstreams by a cross-metathesis reaction of the renewable feedstream with an olefin, such as ethylene, in the presence of a metathesis catalyst. For example, U.S. Pat. No. 4,545,941, discloses production of certain alpha-olefins by reacting triglycerides having fatty acid esters containing isolated carbon-carbon double bonds with ethylene at an ethylene partial pressure of 200-550 psig in the presence of a metathesis catalyst, specifically a catalyst comprising a tungsten compound and a tin compound (e.g., tungsten hexachloride and tetramethyl tin ($WCl_6/(CH_3)_4Sn$)).

Also, Ahmad et al., Co-Metathesis Reaction of Crude Palm Oil and Ethene, Journal of the American Oil Chemists' Society Pub. No. 72(6), 757-758 (1995), discloses the co-metathesis reaction of crude palm oil with ethene in the presence of tungsten hexachloride and tetramethyl tin ($WCl_6/(CH_3)_4Sn$), followed by termination of this reaction with methanol, which gives terminal olefins. The major metathesis products are 1-decene and methyl-9-decenoate.

Further, U.S. Patent Publication No. 2007/0179307 discloses a process for co-producing an olefinic fraction and a composition of diacids or diesters of fats from an unsaturated fat and ethylene. The process comprises, in succession: a) metathesis of an unsaturated fat with ethylene in the presence of a metathesis catalyst and at least one non-aqueous ionic liquid; b) separating and recycling the ionic liquid used in the first step; c) separating, by distillation, the olefinic fraction (fraction A) from the unsaturated fat mono-ester or mono-basic acid fraction (fraction B) formed in step a); d) homometathesis of the mono-unsaturated fat ester or acid cut (fraction B), which allows the co-production of unsaturated fat diesters or diacids (fraction C) and ethylene which is recycled to the first metathesis step of the process; and e) optionally, recycling the ionic liquid containing the catalyst used in step d). Particularly preferred starting material is an oleic sunflower seed oil, an oleic rapeseed oil, or a mixture of mono-alcohol esters of said oils, whereupon the process can produce both an olefinic fraction (mainly composed of 1-decene) and a composition of diesters or diacids; where, in general, over half of the chains constitute unsaturated $C_{18}$ chains (mainly composed of 9-octadecene-1,18-diacid or diester).

LAOS, regardless of source, may be polymerized to produce PAOs. PAOs generally refer to a class of hydrocarbons manufactured by the catalytic oligomerization (polymerization to generally low-molecular-weight products) of LAO monomers. Co-oligomers of lower olefins, such as, ethylene and propylene, may also be used to produce PAOs, including the ethylene-alphaolefin copolymers described in U.S. Pat. No. 4,956,122 and the patents referred to therein.

Specifically, PAOs of different viscosity grades may be produced by the polymerization of LAO feeds in the presence of a catalyst, usually $AlCl_3$, $BF_3$, promoted $AlCl_3$, or promoted $BF_3$. These catalysts exhibit higher reactivity toward LAOs than towards branched or internal olefins. Therefore, when oligomerizing a crude feed containing LAOS, branched olefins, and/or internal olefins with these catalysts, a process-generated side stream of unreacted monomers (branched olefins and/or internal olefins) is usually produced.

Processes for the production of PAOs are disclosed, for example, in the following patents: U.S. Pat. Nos. 3,149,178; 3,382,291; 3,742,082; 3,780,128; 3,833,678; 3,997,621; 4,172,855; 4,956,122; 6,410,812; 6,949,688; WO 2007/011, 462; and WO 2007/111,776, all of which are incorporated by reference.

Other publications propose polymerization of various alpha-olefins in the presence of metallocene catalyst systems to provide polymers having various utilities, such as lubricant components. For example, WO 2007/011462 discusses a process for producing PAOs of high viscosity index (HVI-PAOs), including contacting a feed comprising a mixture of LAOs with an activated metallocene catalyst to produce liquid polymers for use in lubricant components or as functional fluids. The copolymer composition may be made from at least two different alpha-olefins of $C_3$ to $C_{30}$ range, with monomers randomly distributed in the polymers. In an embodiment, one of the monomers is a higher alpha-olefin, such as one chosen from $C_{12}$ to $C_{18}$ alpha-olefins, and the second one or more alpha-olefin is, e.g., chosen from $C_3$ to $C_7$ alpha-olefins. In another embodiment, propylene or 1-butene, which are readily available from refinery or petrochemical plants, are used as one of the feed components. The resulting copolymers are said to have useful lubricant properties, including excellent viscosity index, pour point, and low temperature viscometrics, by themselves or as a blend fluid with other lubricants or polymers.

In another example, U.S. Pat. No. 5,859,159 is directed towards a dilute process for the polymerization of non-ethylene, alpha-olefin homopolymers, and copolymers in the presence of metallocene catalyst systems. The alpha-olefin feed stream used in the process comprises at least one alpha-olefin, such as propylene, 1-butene, 1-pentene, 4-methyl-pent-1-ene, 1-hexene, 1-octene, and higher alpha-olefins up to and including 1-nonadecene, e.g., mixtures of propylene and 1-butene. The 1-butene-propylene polymers of most of the examples have an isotactic index of at least 80%. Other examples include U.S. Pat. No. 6,706,828, which discusses production of PAOs in the presence of meso-forms of certain metallocene catalysts under high hydrogen pressure with methyl alumoxane as an activator. WO 02/14384 and WO 99/67347 discuss similar topics. Other examples include U.S. Pat. Nos. 4,704,491; 5,087,788; 5,688,887; 6,043,401; 6,133,209; 6,414,090; 6,414,091; 6,548,724; 6,706,828; 6,713,438; WO 96/23751; WO 03/020856; and EP 0 613 873.

Furthermore, WO 2010/074738 discloses an integrated production of synthetic PAOs from renewable feedstreams by metathesis of the renewable feedstream with an alpha-olefin then polymerization of the resulting LAOs with a polymerization catalyst, such as $AlCl_3$, $BF_3$, or a metallocene catalyst promoted with an alumoxane or a non-coordinating anion. When Ziegler catalysts, $CrO/SiO_2$ catalysts, or metallocene catalysts are used for the polymerization process, only LAOs will be incorporated to give polyalphaolefins (PAOs). The internal olefins will not be incorporated into the polymer (WO 2010/074738, paragraph [0045]).

There remains a need for efficient methods of incorporating LAOs into PAOs to provide new PAOs with desirable properties. There remains a need to effectively incorporate internal olefins (especially alpha, internally unsaturated, non-conjugated olefins or "AIUNOs") into PAOs to produce new LAO-AIUNO copolymers. There is also a need for methods of producing LAO-AIUNO copolymers from feedstreams containing LAOs and AIUNOs, in particular, from renewable feedstreams. There is further a need for commercially economical routes to desirable PAOs, in particular, PAO which can be functionalized, and in turn used for the preparation of functionalized PAOs, such as LAO-AIUNO copolymers.

SUMMARY OF THE INVENTION

This invention relates to a LAO-AIUNO copolymer comprising at least one $C_4$ to $C_{40}$ LAO monomer and at least one AIUNO monomer, wherein the LAO-AIUNO copolymer comprises at least one pendant chain; and wherein the at least one pendant chain has at least one internal site of unsaturation.

This invention also relates to a process to produce a LAO-AIUNO copolymer comprising: contacting a feedstream comprising a mixture of at least one $C_4$ to $C_{40}$ LAO and at least one AIUNO with a metallocene catalyst system, and wherein a LAO-AIUNO copolymer is produced.

This invention also relates to an integrated process to produce a LAO-AIUNO copolymer comprising: (a) contacting at least one renewable feedstream with at least one lower olefin in the presence of a metathesis catalyst, wherein a polymerization feedstream of a mixture of at least one $C_4$ to $C_{40}$ LAO and at least one AIUNO is produced; and (b) contacting the polymerization feedstream with a metallocene catalyst system, wherein a LAO-AIUNO copolymer is produced.

This invention also relates to an integrated system for the manufacture of a LAO-AIUNO copolymer comprising: (a) a metathesis reactor for the metathesis of a renewable feedstream to produce a mixture of LAOs and AIUNOs; (b) a fractionating column for the separation of desired fractions, comprising LAOs and AIUNOs, from the metathesis product mixture; and (c) a polymerization reactor equipped with a metallocene catalyst system for the polymerization of LAOs and AIUNOs to produce LAO-AIUNO copolymers, wherein the components of the integrated system are in fluid connection with each other.

BRIEF DESCRIPTION OF THE FIGURES

FIG. 1 is a representation of structures of some useful fatty acids found in natural oils.

FIG. 2 is an exemplary representation of an integrated process to produce poly(1-decene)(1,4-decadiene) from renewable sources.

FIG. 3 is an exemplary representation of an integrated process to produce poly(1-hexene)(1-decene)(1,4-decadiene) from renewable sources.

FIG. 4 is a representation of an integrated system for the production of LAO-AIUNO copolymers.

DETAILED DESCRIPTION

For the purposes of this invention and the claims thereto, the new numbering scheme for the Periodic Table Groups is used as in CHEMICAL AND ENGINEERING NEWS, 63(5), 27 (1985).

For the purposes of this invention and the claims thereto, when a polymer is referred to as "comprising an olefin," the olefin present in the polymer is the polymerized form of the olefin, for example, when a polymer is referred to as having 30 wt % decene, that polymer has 30 wt % units derived from decene. A "polymer" has one or more of the same or different mer units. A "copolymer" is a polymer having two or more mer units that are different from each other. An "oligomer" is a polymer having two to 100 mer units, where the mer units may be the same or different. Exemplary oligomers include dimers (two mer units), trimers (three mer units), tetramers (four mer units), decamers (ten mer units), and so on.

An "olefin," alternatively known as "alkene," is a linear, branched, or cyclic compound of carbon and hydrogen having at least one double bond. An "alpha-olefin" is an olefin having a double bond at the alpha (or 1-) position. A "linear alpha-olefin" or "LAO" is an olefin with a double bond at the alpha position and a linear hydrocarbon chain. A "polyalphaolefin" or "PAO" is a polymer comprising at least 30 wt % of an alpha-olefin monomer, based on weight percent of the PAO.

An "alpha, internally unsaturated nonconjugated olefin" or "AIUNO," is an olefin having at least two double bonds, one at the alpha (1) position and at least one at the delta (4) or greater position, but not the omega (or terminal) position. Examples of AIUNOs include 1,4-decadiene, 1,5-decadiene, 1,6-decadiene and 1,4-hexadiene, but not 1,9-decadiene or 1,5-hexadiene. A "polyene" is an olefin with at least two double bonds, where at least one double bond is internal. A "LAO-AIUNO copolymer" is a copolymer derived from at least one LAO monomer and at least one AIUNO monomer. The arrangement of the monomer units (LAO and AIUNOs) in the LAO-AIUNO copolymer may be alternating, random, block, periodic, or any other arrangement known in the art.

For the purposes of this invention and the claims thereto, when catalyst compounds are described as comprising neutral stable forms of the components, it is well understood by one of ordinary skill in the art, that the ionic form of the component is the form that reacts with the monomers to produce polymers. In the description herein, the transition metal compound used for catalysis may be described as a catalyst precursor, a pre-catalyst compound, or a catalyst compound, and these terms are used interchangeably. A "catalyst system" is combination of at least one catalyst compound, at least one activator, an optional co-activator, and an optional support. A "polymerization" catalyst system is a catalyst system that can polymerize monomers to polymer. Additionally, a "reactor" is any container(s) in which a chemical reaction occurs.

For the purposes of this invention and the claims thereto, wt % is weight percent, mol % is mole percent, vol % is volume percent, Me is methyl, Et is ethyl, Pr is propyl, n-Pr is normal propyl, Ph is phenyl, and Cp is cyclopentadienyl.

This invention relates to LAO-AIUNO copolymers produced from feedstreams comprising $C_4$ to $C_{40}$ LAOs and AIUNOs. This invention also relates to functionalization of LAO-AIUNO copolymers obtained from olefin feedstreams comprising $C_4$ to $C_{40}$ LAOs and AIUNOs. This invention further relates to processes to produce LAO-AIUNO copolymers from olefin feedstreams comprising $C_4$ to $C_{40}$ LAOs and AIUNOs.

In other embodiments, this invention relates to an integrated process to produce LAO-AIUNO copolymers from olefin feedstreams comprising $C_4$ to $C_{40}$ LAOs and AIUNOs. In yet other embodiments, this invention relates to an integrated process to produce LAO-AIUNO copolymers from renewable feedstreams, such as natural oils. In further embodiments, this invention relates to an integrated system for the production of LAO-AIUNO copolymers.

(Alpha-Olefin)(Alpha, Internally Unsaturated, Nonconjugated Olefins) Copolymers

This invention relates to a LAO-AIUNO copolymer comprising at least one $C_4$ to $C_{40}$ LAO monomer and at least one AIUNO monomer, wherein the LAO-AIUNO copolymer comprises at least one pendant chain; and wherein the at least one pendant chain has at least one internal site of unsaturation. "Pendant," as used herein, means appending from the polymer backbone.

The monomers to make the LAO-AIUNO copolymer comprise at least one $C_4$ to $C_{40}$ LAO (alternately $C_5$ to $C_{40}$, alternately $C_6$ to $C_{40}$, alternately $C_7$ to $C_{40}$, alternately $C_8$ to $C_{40}$, alternately $C_9$ to $C_{40}$, alternately $C_{10}$ to $C_{40}$) monomer and at least one AIUNO monomer. LAO monomers useful herein have the general formula H—C=C—R*, wherein each R* is independently, a $C_1$ to $C_{38}$ hydrocarbyl or a $C_1$ to $C_{38}$ substituted hydrocarbyl, preferably a $C_1$ to $C_{30}$ hydrocarbyl or a $C_1$ to $C_{30}$ substituted hydrocarbyl (alternately $C_2$ to $C_{38}$, alternately $C_3$ to $C_{38}$, alternately $C_4$ to $C_{38}$, alternately $C_5$ to $C_{38}$, alternately $C_6$ to $C_{38}$, alternately $C_7$ to $C_{38}$, alternately $C_8$ to $C_{38}$, alternately $C_2$ to $C_{30}$, alternately $C_3$ to $C_{30}$, alternately $C_4$ to $C_{30}$, alternately $C_5$ to $C_{30}$, alternately $C_6$ to $C_{30}$, alternately $C_7$ to $C_{30}$, alternately $C_8$ to $C_{30}$ hydrocarbyl or substituted hydrocarbyl). The at least one $C_4$ to $C_{40}$ LAO is preferably at least one $C_4$ to $C_{25}$ LAO, preferably at least one $C_4$ to $C_{12}$ LAO, preferably 1-butene, 1-pentene, 1-hexene, 1-heptene, 1-octene, 1-nonene, 1-decene, 1-dodecene, 1-undecene, and/or 1-tetradecene.

In a preferred embodiment, the LAO is a $C_4$ to $C_{40}$ LAO, preferably a $C_6$ to $C_{35}$ LAO, preferably a $C_8$ to $C_{30}$ LAO, preferably a $C_{10}$ to $C_{25}$ LAO.

In any embodiment described herein, the LAO is not ethylene.

In any embodiment described herein, the LAO is not propylene.

In any embodiment described herein, the LAO is not butene.

In any embodiment described herein, the LAO is not pentene.

In any embodiment described herein, preferably the LAO is not ethylene and/or propylene and/or butene and/or pentene.

AIUNO monomers have the general formula as shown below:

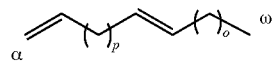

where p is 1 to 40, preferably 1 to 25, preferably 1 to 15, and o is 0 to 40, preferably 0 to 25, preferably 1 to 15.

The AIUNO may be substituted along the carbon chain with one or more substituents, provided that the one or more substituents are substantially inert with respect to the polymerization process. Non-limiting examples of suitable substituents include alkyl moieties, preferably $C_{1-10}$ alkyl moieties, including, for example, methyl, ethyl, propyl, butyl, and the like; cycloalkyl moieties, preferably, $C_{4-8}$ cycloalkyl moieties, including for example, cyclopentyl and cyclohexyl; monocyclic aromatic moieties, preferably, $C_6$ aromatic moieties, that is, phenyl; arylalkyl moieties, preferably, $C_{7-16}$ arylalkyl moieties, including, for example, benzyl; and alkylaryl moieties, preferably, $C_{7-16}$ alkylaryl moieties, including, for example, tolyl, ethylphenyl, xylyl, and the like; as well as hydroxyl, ether, keto, aldehyde, and halide, preferably, chloro and bromo functionalities. The at least one AIUNO monomers are $C_6$ to $C_{85}$ polyenes, preferably $C_6$ to $C_{65}$ polyenes, preferably $C_6$ to $C_{40}$ polyenes, preferably $C_6$ to $C_{25}$ polyenes, preferably $C_6$ to $C_{14}$ polyenes, preferably 1,4-hexadiene, 1,4-octadiene, 1,5-octadiene, 1,6-octadiene, 1,4-nonadiene, 1,5,-nonadiene, 1,6,-nonadiene, 1,7,-nonadiene, 1,4-decadiene, 1,5-decadiene, 1,6-decadiene, 1,7-decadiene, 1,4,7-decatriene, and/or 1,5,8-decatriene.

In any embodiment herein, the LAO-AIUNO copolymer comprises less than 10 wt % ethylene, preferably less than 9 wt %, preferably less than 8 wt %, preferably less than 7 wt %, preferably less than 6 wt %, preferably less than 5 wt %, preferably less than 4 wt %, preferably less than 3 wt %, preferably less than 2 wt %, preferably less than 1 wt % (based upon wt % of copolymer). Preferably, ethylene is present at 0 wt %.

In any embodiment herein, the LAO-AIUNO copolymer comprises less than 10 wt % propylene, preferably less than 9 wt %, preferably less than 8 wt %, preferably less than 7 wt %, preferably less than 6 wt %, preferably less than 5 wt %, preferably less than 4 wt %, preferably less than 3 wt %, preferably less than 2 wt %, preferably less than 1 wt % (based upon wt % of copolymer). Preferably, propylene is present at 0 wt %.

In any embodiment herein, the LAO-AIUNO copolymer comprises less than 10 wt % butene, preferably less than 9 wt %, preferably less than 8 wt %, preferably less than 7 wt %, preferably less than 6 wt %, preferably less than 5 wt %, preferably less than 4 wt %, preferably less than 3 wt %, preferably less than 2 wt %, preferably less than 1 wt % (based upon wt % of copolymer). Preferably, butene is present at 0 wt %.

In an alternate embodiment, the LAO-AIUNO copolymer comprises less than 10 wt % $C_2$ to $C_8$ (e.g., $C_2$, $C_3$, $C_4$, $C_5$, $C_6$, $C_7$, and $C_8$) olefins, preferably less than 9 wt %, preferably less than 8 wt %, preferably less than 7 wt %, preferably less than 6 wt %, preferably less than 5 wt %, preferably less than 4 wt %, preferably less than 3 wt %, preferably less than 2 wt %, preferably less than 1 wt %, preferably less than 0 wt % (based upon wt % of copolymer).

In an alternate embodiment, the LAO-AIUNO copolymer comprises less than 10 wt % $C_2$ to $C_5$ (e.g., $C_2$, $C_3$, $C_4$, and $C_5$) olefins, preferably less than 9 wt %, preferably less than 8 wt %, preferably less than 7 wt %, preferably less than 6 wt %, preferably less than 5 wt %, preferably less than 4 wt %, preferably less than 3 wt %, preferably less than 2 wt %, preferably less than 1 wt %, preferably less than 0 wt % (based upon wt % of copolymer).

In some embodiments, the LAO-AIUNO copolymer has a structure represented by either Formulae I or II below, depending on the method of olefin insertion during the polymerization process. For example, if the insertion of the LAO is 1,2-insertion, the terminal group of the LAO-AIUNO copolymer will be as in Formula I, below. If the insertion is 2,1-insertion, the terminal group of the LAO-AIUNO copolymer will be as in Formula II, below.

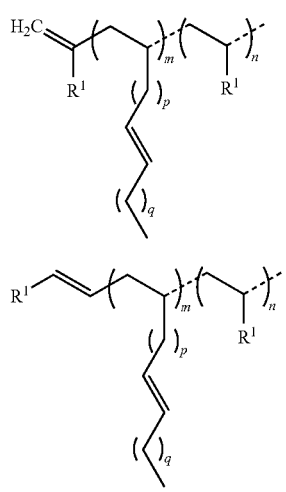

where:
each $R^1$ is independently a $C_2$ to $C_{38}$ hydrocarbyl, preferably $C_2$ to $C_{25}$ hydrocarbyl, preferably $C_2$ to $C_{12}$ hydrocarbyl (alternately $C_3$ to $C_{38}$, alternately $C_4$ to $C_{25}$, alternately $C_5$ to $C_{20}$, alternately $C_6$ to $C_{12}$, alternately $C_7$ to $C_{12}$, alternately $C_8$ to $C_{12}$ hydrocarbyl), preferably ethyl, propyl, butyl, pentyl, octyl, and the like;
m is 1 to 10,000, preferably 1 to 1,000, preferably 1 to 250, preferably 1 to 25;
n is 1 to 10,000, preferably 1 to 1,000, preferably 1 to 250, preferably 1 to 25;
p is 1 to 40, preferably 1 to 25, preferably 1 to 15; and
q is 0 to 40, preferably 0 to 25, preferably 1 to 15.

Although Formulae I and II show one double bond in the pendant chain, one of skill in the art will necessarily recognize that where the AIUNO monomer has more than one internal site of unsaturation, the corresponding LAO-AIUNO copolymer will have more than one site of unsaturation in the pendant chain. For example, if the AIUNO has two internal sites of unsaturation, the corresponding LAO-AIUNO copolymer is represented by Formula III (1,2-insertion) or Formula IV (2,1-insertion).

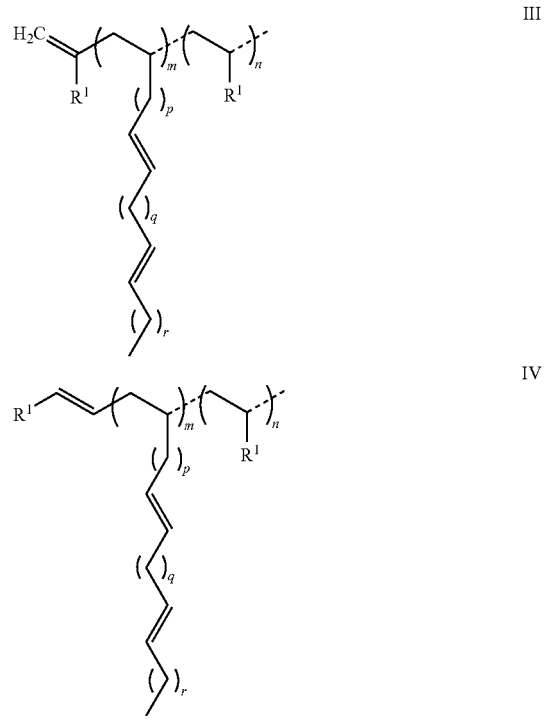

where:
each $R^1$ is independently a $C_2$ to $C_{38}$ hydrocarbyl, preferably $C_2$ to $C_{25}$ hydrocarbyl, preferably $C_2$ to $C_{12}$ hydrocarbyl (alternately $C_3$ to $C_{38}$, alternately $C_4$ to $C_{25}$, alternately $C_5$ to $C_{20}$, alternately $C_6$ to $C_{12}$, alternately $C_7$ to $C_{12}$, alternately $C_8$ to $C_{12}$ hydrocarbyl), preferably ethyl, propyl, butyl, pentyl, octyl, and the like;
m is 1 to 10,000, preferably 1 to 1,000, preferably 1 to 250, preferably 1 to 25 m is 1 to 10,000, preferably 1 to 1,000, preferably 1 to 250, preferably 1 to 25;
n is 1 to 10,000, preferably 1 to 1,000, preferably 1 to 250, preferably 1 to 25;
p is 1 to 40, preferably 1 to 25, preferably 1 to 15;
q is 0 to 40, preferably 0 to 25, preferably 1 to 15; and
r is 0 to 40, preferably 0 to 25, preferably 1 to 15.

Further, the dashed bonds in Formulae I, II, III, and IV indicate that the arrangement of the monomer units (LAO and AIUNOs) in the backbone of the LAO-AIUNO copolymer may be alternating, random, block, periodic, or any other arrangement known in the art.

The amount of unsaturated pendant chains, expressed as mol % of AIUNO incorporated into the LAO-AIUNO copolymer, may be determined by $^1$H NMR-based method, as disclosed in the Experimental Section. In some embodiments, the LAO-AIUNO copolymer has an AIUNO content of 5 mol % or more; 7 mol % or more; 10 mol % or more; 15 mol % or more; 20 mol % or more; 25 mol % or more; 40 mol % or more; 50 mol % or more; 80 mol % or more. In some embodiments, the LAO-AIUNO copolymer comprises at least 85 mol % of a $C_4$ to $C_{40}$ LAO (preferably a $C_5$ to $C_{38}$, $C_6$ to $C_{38}$, $C_7$ to $C_{35}$, $C_8$ to $C_{30}$, $C_9$ to $C_{25}$, or $C_{10}$ to $C_{20}$ LAO) and at least 15 mol % of an AIUNO. In other embodiments, the LAO-AIUNO copolymer comprises at least 85 mol % to 65 mol % of a $C_4$ to $C_{40}$ LAO (preferably a $C_5$ to $C_{38}$, $C_6$ to $C_{38}$, $C_7$ to $C_{35}$, $C_8$ to $C_{30}$, $C_9$ to $C_{25}$, or $C_{10}$ to $C_{20}$ LAO) and at least 15 mol % to 35 mol % of an AIUNO. In other embodiments, the LAO-AIUNO copolymer comprises at least 65 mol % to 45 mol % of a $C_4$ to $C_{40}$ LAO (preferably a $C_5$ to $C_{38}$, $C_6$ to $C_{38}$, $C_7$ to $C_{35}$, $C_8$ to $C_{30}$, $C_9$ to $C_{25}$, or $C_{10}$ to $C_{20}$ LAO) and at least 35 mol % to 55 mol % of an AIUNO. For example, the LAO-AIUNO copolymer may comprise 85 mol % of a $C_4$ to $C_{40}$ LAO (preferably a $C_5$ to $C_{38}$, $C_6$ to $C_{38}$, $C_7$ to $C_{35}$, $C_8$ to $C_{30}$, $C_9$ to $C_{25}$, or $C_{10}$ to $C_{20}$ LAO) and 15 mol % of an AIUNO; 75 mol % of a $C_4$ to $C_{40}$ LAO (preferably a $C_5$ to $C_{38}$, $C_6$ to $C_{38}$, $C_7$ to $C_{35}$, $C_8$ to $C_{30}$, $C_9$ to $C_{25}$, or $C_{10}$ to $C_{20}$ LAO) and 25 mol % of an AIUNO; 65 mol % of a $C_4$ to $C_{40}$ LAO (preferably a $C_5$ to $C_{38}$, $C_6$ to $C_{38}$, $C_7$ to $C_{35}$, $C_8$ to $C_{30}$, $C_9$ to $C_{25}$, or $C_{10}$ to $C_{20}$ LAO) and 35 mol % of an AIUNO; or 55 mol % of a $C_4$ to $C_{40}$ LAO (preferably a $C_5$ to $C_{38}$, $C_6$ to $C_{38}$, $C_7$ to $C_{35}$, $C_8$ to $C_{30}$, $C_9$ to $C_{25}$, or $C_{10}$ to $C_{20}$ LAO) and 45 mol % of an AIUNO.

In particular embodiments, the LAO-AIUNO copolymer may be poly(1-decene)(1,4-decadiene), poly(1-hexene)(1-decene)(1,4-decadiene), poly(1-decene)(1,4-hexadiene), poly(1-hexene)(1-decene)(1,4-hexadiene), poly(1-decene) (1,4,7-decatriene) and poly(1-hexene)(1-decene)(1,4,7-decatriene). The amount of unsaturated pendant chains, expressed as mol % of AIUNO incorporated into the LAO-AIUNO copolymer, is as disclosed above. For example, where the LAO-AIUNO copolymer is poly(1-decene)(1,4-decadiene), the copolymer may comprise 85 mol % of 1-decene and 15 mol % of 1,4-decadiene; 75 mol % of 1-decene and 25 mol % of 1,4-decadiene; 65 mol % of 1-decene and 35 mol % of 1,4-decadiene; or 55 mol % of 1-decene and 45 mol % of 1,4-decadiene.

In a preferred embodiment, the LAO-AIUNO copolymers gave an Mn of 30,000 g/mol or less, typically from 100 to 21,000 g/mol, alternately from 300 to 15,000 g/mol, alternately 500 to 10,000 g/mol, as determined by GPC-SEC, as described in US 2008/0045638, page 37, paragraphs [0600]-[0611] including references cited therein.

In another embodiment, the LAO-AIUNO copolymers have a viscosity index (ASTM D 2270) of 120 or more, preferably 130 or more, preferably 135 or more, preferably 140 or more.

In another embodiment, the LAO-AIUNO copolymers have a kinematic viscosity at 100° C., $KV_{100}$, (ASTM D 445) of 4 cSt or more, preferably 6 cSt or more, preferably 10 cSt or more, preferably 20 cSt or more, preferably 40 cSt or more, preferably 100 cSt or more, preferably 150 cSt or more, preferably 300 cSt or more.

In another embodiment, the LAO-AIUNO copolymers have a pour point (ASTM D 97) of −10° C. or less, preferably −20° C. or less, preferably −30° C. or less.

In another embodiment, the LAO-AIUNO copolymers have a flash point (ASTM D 92) of 200° C. or more, preferably 220° C. or more, preferably 240° C. or more.

In another embodiment, the LAO-AIUNO copolymers have a specific gravity (15.6/15.6° C. ASTM D 4052) of 0.86 or less, preferably 0.85 or less, preferably 0.84 or less.

In another embodiment, the LAO-AIUNO copolymer has a viscosity index of 120 or more, a $KV_{100}$ of 4 cSt or more, a pour point of −10° C. or less, and a specific gravity of 0.86 or less.

Monomers: Linear Alpha-olefins (LAOs) and Alpha, Internally Unsaturated, Nonconjugated Olefins (AIUNOs)

LAOs and AIUNOs are monomers for LAO-AIUNO copolymers described herein. LAOs and AIUNOs may be produced synthetically, by any means known in the art, including isolation or derivativization from nonrenewable feedstreams including natural gas, coal, and petroleum. LAOs and AIUNOs may also be produced from renewable feedstreams including fatty acids, fatty acid esters, or natural oils, by metathesis with a lower olefin, as shown below.

Non-renewable Feedstreams

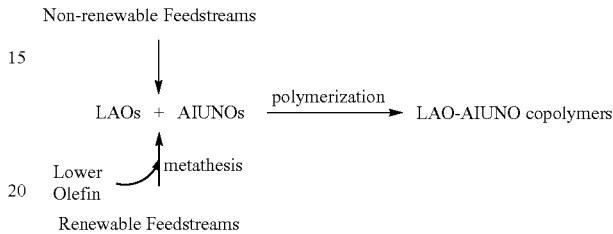

Renewable Feedstreams

Metathesis of Renewable Feedstreams to Produce LAOs and AIUNOs

LAOs and AIUNOs are produced by the cross metathesis of olefins (typically lower olefins, such as ethylene), and fatty acids, fatty acid esters, or natural oils, in the presence of a suitable metathesis catalyst.

Lower Olefins

Besides the feed materials, the metathesis process of this invention may require a lower olefin as a reactant. For purposes of this invention and the claims thereto, the term "lower olefin" refers to an organic compound containing at least one carbon-carbon double bond and typically having less than 4 carbon atoms. Lower olefins may be represented by the formula: $R^*$—HC═CH—$R^*$, wherein each $R^*$ is independently, hydrogen or a $C_1$ to $C_2$ hydrocarbyl, preferably hydrogen, methyl, or ethyl, more preferably $R^*$ is hydrogen. In a preferred embodiment, both $R^*$ are the same, preferably both $R^*$ are hydrogen. For example, ethylene is a lower olefin that is particularly useful in embodiments herein.

Non-limiting examples of suitable lower olefins include ethylene, propylene, butene, butadiene, and isomers thereof. Preferably, the lower olefin is ethylene.

Renewable Feedstreams

"Renewable feedstreams" as used herein, means starting materials that are derived from renewable sources. A source is considered renewable if it is replenished by nature at a faster rate than it is consumed. Renewable feedstreams useful herein include fatty acids, fatty acid esters, natural oils, biodiesel, triacylglycerides, or mixtures thereof.

Natural Oils

"Natural oils," as used herein, includes oils derived from biological sources, including animals, plants, algae, and fungi. Natural oils typically comprise mixtures of fatty acids and fatty acid esters, which are discussed below. These fatty acids often naturally occur as esters of three fatty acids and glycerol, known as triglycerides, also discussed below.

Natural oils useful herein preferably contain fatty acids and fatty acid esters with at least one site of unsaturation and include, but are not limited to, canola oil, corn oil, soybean oil, rapeseed oil, algae oil, peanut oil, mustard oil, sunflower oil, tung oil, tall oil, perilla oil, grapeseed oil, linseed oil, safflower oil, pumpkin oil, palm oil, Jatropha oil, high-oleic soybean oil, high-oleic safflower oil, high-oleic sunflower oil, mixtures of animal and vegetable fats and oils, beef tallow, castor bean oil, dehydrated castor bean oil, cucumber oil, poppyseed oil, flaxseed oil, lesquerella oil, walnut oil, cottonseed oil, meadowfoam, tuna oil, sesame oils, waste oils/greases, and mixtures thereof.

While readily available vegetable oils are preferred sources of fatty acids for practicing disclosed embodiments of the present process, fatty acids and fatty acid esters available from animal fats including, without limitation, lard and fish oils, such as sardine oil, tuna oil, herring oil, and the like, may be employed in embodiments herein. Furthermore, particular fatty acids or fatty acid precursors may also be advantageously available from genetically modified organisms, such as genetically modified plants, particularly genetically modified algae. Such genetically modified organisms are typically designed to produce a desired fatty acid or fatty acid precursor biosynthetically or to advantageously produce increased amounts of such compounds. Preferred natural oils include palm oil, soybean oil, sunflower oil, canola oil, Jatropha oil, and algae oil.

Fatty Acids and Fatty Acid Esters

Fatty acids are carboxylic acids with saturated or unsaturated aliphatic tails that occur naturally in many different natural oils. Fatty acid esters are alkyl esters of fatty acids, preferably $C_1$ to $C_{12}$ esters, preferably $C_1$ to $C_5$ esters, preferably methyl, ethyl, n-propyl, n-butyl esters, more preferably methyl or ethyl esters. An unsaturated fatty acid comprises a long carbon chain containing at least one carbon-carbon double bond and terminating in a carboxylic acid group. An unsaturated fatty acid ester also comprises a long carbon chain containing at least one carbon-carbon double bond but terminates in a carboxylate group.

Unsaturated fatty acids, unsaturated fatty acid esters, and mixtures thereof are of particular importance in embodiments herein. Any unsaturated fatty acid or fatty acid ester may be suitably employed to produce LAOs and/or AIUNOs, provided that the unsaturated fatty acid or fatty acid ester can be metathesized in the manner disclosed herein. At least one carbon-carbon double bond may occur at any internal location, usually about the middle of the aliphatic tail. A terminal carbon-carbon double bond, at the opposite end of the carbon chain relative to the carboxylic acid or carboxylate group, is also suitably employed, although terminal carbon-carbon double bonds occur less commonly in fatty acids. The structures of some fatty acids useful in embodiments of the present invention are shown in FIG. 1.

Monounsaturated fatty acids and fatty acid esters contain one carbon-carbon double bond in the long aliphatic tail. Examples of monounsaturated fatty acids and fatty acid esters, useful herein, include myristoleic acid, palmitoleic acid, sapienic acid, oleic acid, erucic acid, and alkyl esters thereof. Polyunsaturated fatty acids and fatty acid esters contain two or more carbon-carbon double bonds in the long aliphatic tail. Examples of polyunsaturated fatty acids and esters, useful herein, include linoleic acid, linolenic acid, arachidonic acid, eicosapentaenoic acid, docosahexaenoic acid, and alkyl esters thereof. Some natural oils may contain fatty acids and fatty acid esters that are polyunsaturated, and some of the sites of unsaturation may be internal. Such polyunsaturated fatty acids and esters are particularly useful herein. For instance, oleic acid, linoleic acid, and linolenic acid, and their respective esters are examples of fatty acid and fatty acid esters with internal sites of unsaturation. Methyl oleate has one internal double bond, methyl linoleate has two internal double bonds, and methyl linolenoate has three internal double bonds, as shown below.

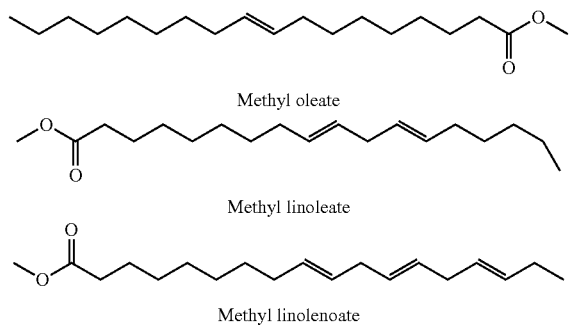

Methyl oleate

Methyl linoleate

Methyl linolenoate

Fatty acids and fatty acid esters, useful herein, include monounsaturated fatty acids and esters thereof, polyunsaturated fatty acids and esters thereof, and mixtures of monounsaturated and polyunsaturated fatty acids and esters thereof.

Typically, the unsaturated fatty acid will contain greater than 8 carbon atoms, preferably, greater than 10 carbon atoms, and more preferably, greater than 12 carbon atoms. Typically, the unsaturated fatty acid will contain less than 50 carbon atoms, preferably, less than 35 carbon atoms, and less than 25 carbon atoms.

The unsaturated fatty acid may be straight or branched, and may be substituted along the fatty acid chain with one or more substituents, provided that the one or more substituents are substantially inert with respect to the metathesis process. Non-limiting examples of suitable substituents include alkyl moieties, preferably $C_{1-10}$ alkyl moieties, including, for example, methyl, ethyl, propyl, butyl, and the like; cycloalkyl moieties, preferably $C_{4-8}$ cycloalkyl moieties, including for example, cyclobutyl, cyclopentyl, cyclohexyl and cyclooctyl; monocyclic aromatic moieties, preferably $C_6$ aromatic moieties, including for example, phenyl; and alkylaryl moieties, preferably $C_{7-16}$ alkylaryl moieties, including, for example, tolyl, ethylphenyl, xylyl, and the like; as well as hydroxyl, ether, keto, aldehyde, and halide, preferably, chloride and bromide, functionalities.

Non-limiting examples of suitable unsaturated fatty acid and fatty acid esters include 3-hexenoic (hydrosorbic), trans-2-heptenoic, 2-octenoic, 2-nonenoic, cis- and trans-4-decenoic, 9-decenoic (caproleic), 10-undecenoic (undecylenic), trans-3-dodecenoic (linderic), tridecenoic, cis-9-tetradeceonic (myristoleic), pentadecenoic, cis-9-hexadecenoic (cis-9-palmitoelic), trans-9-hexadecenoic (trans-9-palmitoleic), 9-heptadecenoic, cis-6-octadecenoic (petroselinic), trans-6-octadecenoic (petroselaidic), cis-9-octadecenoic (oleic), trans-9-octadecenoic (elaidic), cis-11-octadecenoic, trans-11-octadecenoic (vaccenic), cis-5-eicosenoic, cis-9-eicosenoic (gadoleic), cis-1'-docosenoic (cetoleic), cis-13-docosenoic (erucic), trans-13-docosenoic (brassidic), cis-15-tetracosenoic (selacholeic), cis-17-hexacosenoic (ximenic), and cis-21-triacontenoic (lumequeic) acids, as well as 2,4-hexadienoic (sorbic), cis-9-cis-12-octadecadienoic (linoleic), cis-9-cis-12-cis-15-octadecatrienoic (linolenic), eleostearic, 12-hydroxy-cis-9-octadecenoic (ricinoleic), and like acids and corresponding esters thereof. Particularly, preferred fatty acids and fatty acid esters, useful herein, include oleic acid, linoleic acid, linolenic acid, and esters thereof.

The natural oils useful in the processes described herein typically include a mixture of saturated (Cn:0), monounsaturated (Cn:1), and polyunsaturated (Cn:2, 3, etc.) fatty acids, where n is the number of carbon atoms present in the fatty acid. For example, the fatty acid profiles of several potential natural oil feedstreams are shown in Table 1, below.

TABLE 1

Fatty Acid Profile of Several Typical Natural Oils

| Fatty Acid | Wt % | | | | |
|---|---|---|---|---|---|
| | Palm | Soybean | Sunflower | Canola | Jatropha |
| Myrisitic (C14:0) | 1.1 | 0.1 | 0 | 0 | 0.1 |
| Palmitic (C16:0) | 44 | 11.0 | 0 | 3.9 | 14.2 |
| Stearic (C18:0) | 4.5 | 4.0 | 4.5 | 1.9 | 7 |
| Oleic (C18:1) | 39.2 | 23.4 | 21.1 | 64.1 | 44.7 |
| Linoleic (C18:2) | 10.1 | 53.2 | 66.2 | 18.7 | 32.8 |
| Linolenic (C18:3) | 0.4 | 7.8 | 0 | 9.2 | 0.2 |
| Arachidic (C20:0) | 0 | 0 | 0.3 | 0.6 | 0.2 |
| Miscellaneous | 0.7 | 0.5 | 7.9 | 1.6 | 0.8 |

In a preferred embodiment, the renewable feedstream comprises a combination of natural oils. Preferred combinations include two or more of tall oil, palm oil, tallow, waste grease, rapeseed oil, canola oil, soybean oil, sunflower oil, Jatropha oil, and algae oil. Alternate useful combinations include two (three or four) or more of soybean oil, sunflower oil, palm oil, canola oil, rapeseed oil, algae oil, Jatropha oil, and tallow.

Triacylglycerides (TAGs)

The chief constituent of natural oils is triacylglycerides (TAGs), also called triglycerides. TAGs are a naturally occurring ester of three fatty acids and glycerol. The three fatty acids can be all different, all the same, or only two the same. They can be saturated or unsaturated fatty acids, and the saturated fatty acids may have one or multiple sites of unsaturations. Chain lengths of the fatty acids in naturally occurring TAGs can be of varying lengths but 16, 18, and 20 carbons are the most common. Natural fatty acids found in plants and animals are typically composed of even numbers of carbon atoms due to the way they are bio-synthesized. Most natural fats contain a complex mixture of individual triglycerides and because of this, they melt over a broad range of temperatures.

TAGs typically have the chemical structure:

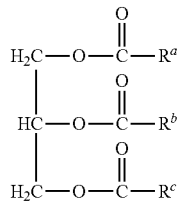

where $R^a$, $R^b$, and $R^c$ each, independently, represent a saturated or non-saturated hydrocarbon chain (preferably $R^a$, $R^b$, and $R^c$ each, independently, are a $C_{12}$ to $C_{28}$ alkyl or alkene, preferably $C_{16}$ to $C_{22}$ alkyl or alkene).

Different vegetable oils have different fatty acid profiles, with the same or different fatty acids occurring on a single glycerol. For example, an oil can have linoleic, oleic, and stearic acids attached to the same glycerol, with each of $R^a$, $R^b$, and $R^c$ representing one of these three fatty acids. In another example, there can be two oleic acids and one stearic acid attached to the same glycerol, each of $R^a$, $R^b$, and $R^c$ representing one of these fatty acids.

In one embodiment, a useful TAG consists of three unsaturated fatty acids, where at least one fatty acid is oleic acid. In another embodiment, a useful TAG consists of three unsaturated fatty acids, where at least one fatty acid is linoleic acid. In yet another embodiment, a useful TAG consists of three unsaturated fatty acids, where at least one fatty acid is oleic acid and at least one fatty acid is linoleic acid. In other embodiments, a mixture of different TAGs may be used.

Other materials containing fatty acid glycerides or other fatty acid esters can also be used, including phospholipids, lysophospholipids, and fatty acid wax esters. The free fatty acid content of useful natural oils is preferably about 0.1 wt % or less when employed in a basic homogeneous catalyst esterification reaction. Higher levels can be utilized as well, and levels up to about 3.0 wt %, or even as high as about 15.0 wt % or more may be tolerated.

TAGs may be processed by transesterification with alcohols to give biodiesel. Biodiesel is typically a mixture of mono-alkyl fatty acid esters, and is useful as a renewable feedstream for methods disclosed herein. The processing of natural oils is discussed in greater detail below.

Processing of Renewable Feedstreams

Raw or unrefined oils can be used in certain embodiments. However, filtered and refined oils are typically preferred. Use of degummed and filtered feedstreams minimizes the potential for emulsification and blockage in the reactor systems. Feedstreams with high water content can be dried before use. Feedstreams with high free fatty acid content can be passed through an esterification process to reduce the free fatty acid content before the process of esterification to convert fatty acid glycerides to monoalkyl esters. The reduction of free fatty acids and the conversion of fatty acid glycerides can be accomplished in the same processing step. Feedstreams containing other organic compounds (such as hexane, heptane, isohexane, etc.) can typically be processed without significant modifications to the reactor system.

In certain embodiments, processed oils, such as blown oils, are the source of fatty acids useful herein. Blown oils are processed through partial oxidation. Common blown oils available include linseed oil, castor oil, fish oil, and soybean oil.

Natural oils may be further processed before use in the present invention, for example, natural oils may be esterified with alcohols to covert any fatty acids present to fatty acid esters, to produce biodiesel. Biodiesel is a mixture of monoalkyl fatty acid esters typically derived from the transesterification of natural oils and alcohols. While natural oils and alcohols are commonly employed as reactants in esterification reactions, any fatty acid source, such as free fatty acids, soaps, esters, glycerides (mono-, di-, and tri-), phospholipids, lysophospholipids, or amides and a monohydric alcohol source, such as an alcohol, can be esterified.

Biodiesel compositions that are particularly useful in this invention are those which have high concentrations of oleic acids, erucic acids, and esters thereof. These fatty acids and esters have one site of unsaturation such that cross-metathesis with ethylene yields the LAO, 1-decene, as the coproduct. Preferred biodiesel compositions are those produced from natural oils such as canola oil, rapeseed oil, palm oil, and other high oleic or high erucic oils. Particularly preferred natural oils include those having at least 30 mol % combined oleic and erucic fatty acid or esters of all fatty acid and fatty acid esters combined, preferably at least 40%, preferably at least 50%, preferably at least 60%, preferably at least 70%, preferably at least 80%, preferably at least 90%.

In other embodiments, biodiesel compositions that are particularly useful in this invention are those which have high concentrations of linoleic acid, linolenic acid, and esters thereof. These fatty acids and esters have multiple internal sites of unsaturation such that cross-metathesis with ethylene yields AlUNOs. Preferred biodiesel compositions are those produced from vegetable oils such as soybean oil, sunflower oil, Jatropha oil, and other high linoleic and linolenic oils. Particularly preferred vegetable oils include those having at least 30 mol % linoleic acid, linolenic acid, or esters thereof of all fatty acid and fatty acid esters combined, preferably at least 40%, preferably at least 50%, preferably at least 60%, preferably at least 70%, preferably at least 80%, preferably at least 90%.

In yet other embodiments, biodiesel compositions that are particularly useful in this invention are those which have high concentrations of oleic, erucic, linoleic, and linolenic acids and respective esters thereof. Preferred biodiesel compositions are those produced from vegetable oils such as canola oil, soybean oil, sunflower oil, Jatropha oil, and other oils having a high concentration of oleic, erucic, linoleic, and linolenic acids and respective esters thereof. Particularly preferred vegetable oils include those having at least 50 mol % oleic, erucic, linoleic, and linolenic acids and respective esters thereof of all fatty acid and fatty acid ester chains combined, preferably at least 60%, preferably at least 70%, preferably at least 80%, preferably at least 90%.

Metathesis Catalyst

Any suitable metathesis catalyst may be used in the cross-metathesis reaction to produce LAOs and/or AlUNOs. For example, some suitable metathesis catalysts include organometallic compounds of tungsten, molybdenum, ruthenium, tantalum, and rhenium. In some embodiments, the metathesis catalyst may be supported. Suitable supports include $Al_2O_3$, $ZrO_2$, $Ta_2O_5$, $SiO_2$, $WO_3$, or $SiO_2/Al_2O_3$.

Some common metathesis catalysts useful herein include catalysts containing tungsten or molybdenum. These catalysts are described in the chapter "Catalysts for the Homogeneous Metathesis of Functionalized Olefins" by J. C. Mol, on pg. 115 of the book "Olefin Metathesis and Polymerization Catalysts, Synthesis, Mechanism and Utilization," ed. by Y. Imamoglu, B. Zumreoglu-Karan and A. J. Amass, Proceedings of the NATO Advanced Science Institutes Series, Published by Kluwer Academic Publisher, Dordrecht, The Netherlands, 1990, incorporated herein by reference. Solid supported $Re_2O_7/Al_2O_3$ catalyst can also be used for this reaction. The solid catalyst is described by J. C. Mol, "Olefin Metathesis over Supported Rhenium Oxide Catalysts," Catalysis Today, 51 (1999) pp. 289-299, which is incorporated herein by reference. The metathesis catalyst may also be an activated $WCl_6$ or $MoCl_6$ or $TaCl_5$ or $Re_2O_7$ on a solid support. The solid support may be $Al_2O_3$, $ZrO_2$, $Ta_2O_5$, $SiO_2$, $WO_3$, or $SiO_2/Al_2O_3$. The catalyst may be activated by any means known in the art, including using: (i) a compound of the formula $AlR_aX_b$, wherein R is $C_1$ to $C_6$ alkyl, X is a halide or an alkoxide, preferably chloride or methoxy; a+b equals 3, and each of a and b is 0, 1, 2, or 3; or using (ii) a compound of the formula $SnR_cX_d$, wherein R is $C_1$-$C_6$ alkyl, preferably methyl, ethyl, propyl and so on; X is a halide or an alkoxide, preferably chloride or methoxy; c+d equals 4, and each of c and d is 0, 1, 2, 3, or 4.

Particularly preferred metathesis catalysts for processes disclosed herein include ruthenium-based catalysts bearing phosphine or carbene ligands. Some suitable ruthenium metathesis catalysts include Grubbs Catalyst, first generation; Grubbs Catalyst, second generation; Hoveyda-Grubbs Catalyst, first generation; and Hoveyda-Grubbs Catalyst, second generation which are commercially available from Sigma-Aldrich Chemical Co. (St. Louis, Mo.). Such catalysts are known and widely used in the art, e.g., see Acc. Chem. Res. 2001, 34, 18-29; Angew. Chem., Int. Ed., 2000, 39, 3012-3043; Am. Chem. Soc. 1997, 119, 3887-3897; Tetrahedron Lett. 1999, 40, 2247-2250; Angew. Chem., Int. Ed. 1998, 37, 2490-2493; and U.S. Patent Pub. Nos. 2007/0249796; 2007/0197772, all incorporated herein by reference, including relevant publications identified therein. Other suitable catalysts can be found in the chapter "Olefin Cross-Metathesis" by A. K. Chatterjee, p. 246 of Handbook of Metathesis, Vol. 2, G. H. Grubbs (Ed.), 2003 Wiley-VCH Verlag GmbH & Co. KGaA Weinheim, also incorporated herein by reference. Further, Dow researchers in 2004 achieved catalysts turnovers of approximately 15,000 using the 1st generation Grubb's catalyst, bis(tricyclohexylphosphine)benzylidene ruthenium(IV) dichloride, (Organometallics 2004, 23, 2027) for the cross-metathesis of ethylene and methyl oleate. Researchers at Materia, Inc. have reported turnover numbers up to 35,000 using a ruthenium catalyst containing a cyclic alkyl amino carbene ligand, (WO 2008/010961, "Platform Chemicals from an Oilseed Biorefinery" grant number DE-FG36-04GO14016 awarded by the Department of Energy, Final Technical Report). Additionally, the introduction of chelating isopropoxybenzylidene ligands has led to ruthenium catalysts with improved activities for metathesis reactions (J. Am. Chem. Soc. 1999, 121, 791).

Other preferred metathesis catalyst compounds include those disclosed in U.S. Ser. No. 12/705,136, filed Feb. 12, 2010. Particularly useful examples are shown below.

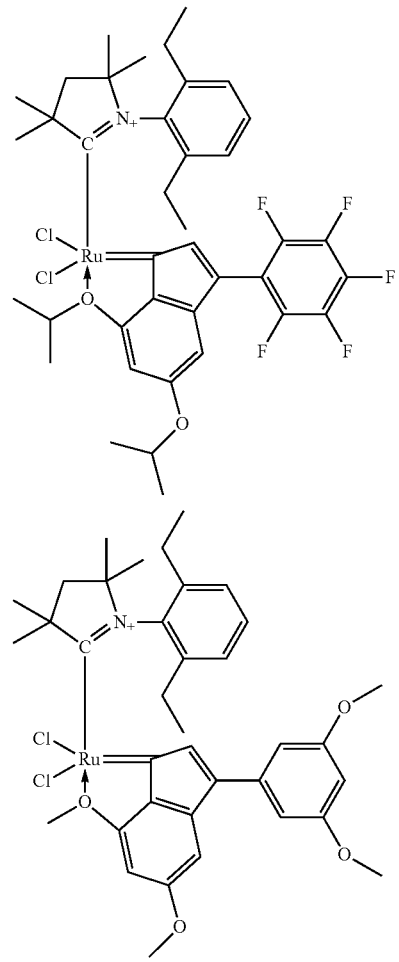

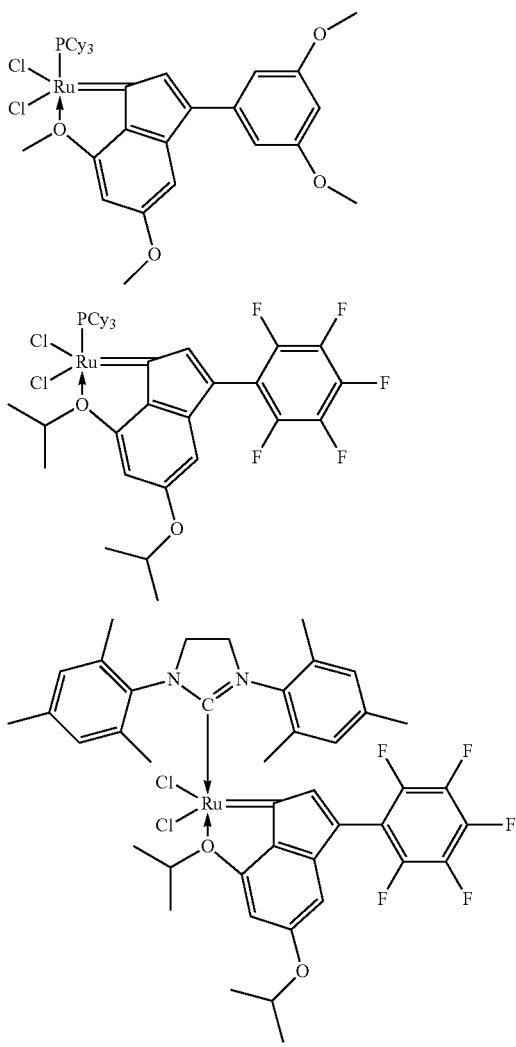

Other preferred metathesis catalyst compounds include those disclosed in U.S. Ser. No. 61/314,388, filed on Mar. 15, 2010. For example, 2-(i-propoxy)-5-(N,N-dimethylaminosulfonyl)phenylmethylene(1-cyclohexylmethyl-3-(2,6-diisopropylphenyl)-4,5-dihydro-1H-imidazole) ruthenium (II) chloride (Formula A) and (1-mesityl-3-methyl-2H-4,5-dihydroimidazol-2-ylidene)(tricyclohexylphosphine)-3-phenyl-1H-inden-1-ylidene ruthenium (II) dichloride (Formula B), as shown below, are particularly useful herein.

Formula A

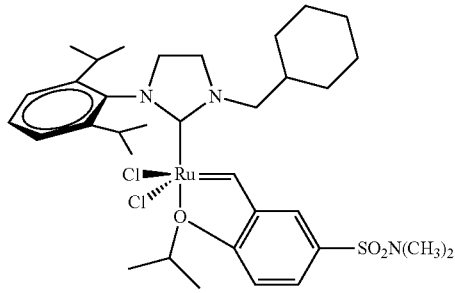

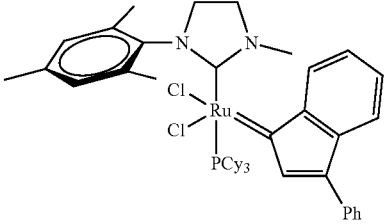

Formula B

Other preferred metathesis catalyst compounds include those disclosed in U.S. Ser. No. 61/259,514, filed on Nov. 9, 2009. For example, 2-(2,6-diethylphenyl)-3,5,5,5-tetramethylpyrrolidine[2-(i-propoxy)-5-(N,N-dimethylaminosulfonyl)phenyl]methylene ruthenium dichloride; 2-(mesityl)-3,3,5,5-tetramethylpyrrolidine[2-(i-propoxy)-5-(N,N-dimethylaminosulfonyl)phenyl]methylene ruthenium dichloride; 2-(2-isopropyl)-3,3,5,5-tetramethylpyrrolidine [2-(i-propoxy)-5-(N,N-dimethylaminosulfonyl)phenyl]methylene ruthenium dichloride; and 2-(2,6-diethyl-4-fluorophenyl)-3,3,5,5-tetramethylpyrrolidine [2-(i-propoxy)-5-(N,N-dimethylaminosulfonyl)phenyl]methylene ruthenium dichloride are useful herein.

Metathesis catalysts, useful herein, may be purchased or synthesized by any means known in the art, for example, by methods disclosed in U.S. Ser. No. 61/259,521, filed on Nov. 9, 2009 and the references cited therein.

Metathesis Processes and LAO and AIUNO Products Thereof

The metathesis catalyst may be combined with the lower olefin and renewable feedstream in any manner known in the art. In one embodiment, the metathesis catalysts described herein may be combined directly with the lower olefin and renewable feedstreams to produce a mixture of: 1) alpha-olefins, preferably LAOS, preferably $C_4$ to $C_{24}$ alpha-olefins, preferably $C_4$ to $C_{24}$ LAOS, such as preferably 1-decene, 1-heptene, and/or 1-butene; and 2) AIUNOs, preferably 1,4-hexadiene, 1,4-octadiene, 1,5-octadiene, 1,6-octadiene, 1,4-nonadiene, 1,5,-nonadiene, 1,6,-nonadiene, 1,7,-nonadiene, 1,4-decadiene, 1,5-decadiene, 1,6-decadiene, 1,7-decadiene, 1,4,7-decatriene, and/or 1,5,8-decatriene.

Typically, the molar ratio of lower olefin to renewable feedstream (such as, unsaturated fatty acid or fatty acid ester) is greater than 0.8:1.0, preferably, greater than 0.9:1.0, greater than 1.0:1.0, greater than 1.5:1.0, greater than 2.0:1.0. Typically, the molar ratio of lower olefin to feed material (such as unsaturated fatty acid or fatty acid ester) is less than 3.0:1.0, preferably, less than 2.0:1.0, less than 1.5:1.0. Depending upon the specific reagents, other molar ratios may also be suitable. When the lower olefin is ethylene, for example, a significantly higher molar ratio can be used, because the self-metathesis of ethylene produces only ethylene again and therefore no undesirable co-product olefins are formed. Accordingly, the molar ratio of ethylene to renewable feedstream may range from greater than 0.8:1 to typically less than 20:1.

Generally, the renewable feedstream comprises unsaturated fatty acid esters and/or unsaturated fatty acids and is provided as a liquid at the process temperature, and it is generally preferred to be used neat, that is, without a diluent or solvent. The use of a solvent usually increases recycle requirements and increases costs. Optionally, however, if desired, a solvent can be employed with the lower olefin and/or renewable feedstream. A solvent may be desirable, for instance, where liquid feed material and lower olefin are not entirely miscible, and both then can be solubilized in a suitable solvent. In certain embodiments, the cross-metathesis reaction reactions of the lower olefin and the renewable feedstream may be run in a biphasic mixture of solvents, in an emulsion or suspension, or in a lipid vesicle or bilayer.

Suitable diluents/solvents for the process include non-coordinating, inert liquids. Examples include straight and branched-chain hydrocarbons such as isobutane, butane, pentane, isopentane, hexanes, isohexane, heptane, octane, dodecane, and mixtures thereof; cyclic and alicyclic hydrocarbons such as cyclohexane, cycloheptane, methylcyclohexane, methylcycloheptane, and mixtures thereof, including those that can be found commercially (Isopar™); perhalogenated hydrocarbons such as perfluorinated $C_{4-10}$ alkanes, chlorobenzene, and aromatic and alkylsubstituted aromatic compounds such as benzene, toluene, mesitylene, and xylene. Suitable diluents/solvents also include aromatic hydrocarbons, such as toluene or xylenes, and chlorinated solvents, such as dichloromethane. In a preferred embodiment, the feed for the process comprises 60 vol % solvent or less, based on the total volume of the feed, preferably 40 vol % or less, preferably 20 vol % or less.

The quantity of metathesis catalyst that is employed in the process of this invention is any quantity that provides for an operable metathesis reaction. Preferably, the ratio of moles of renewable feedstream (such as unsaturated fatty acid or fatty acid ester) to moles of metathesis catalyst is typically greater than 10:1; preferably greater than 100:1; preferably greater than 1,000:1; preferably greater than 10,000:1; preferably greater than 25,000:1; preferably greater than 50,000:1; preferably greater than 100,000:1. Alternately, the molar ratio of renewable feedstream to metathesis catalyst is typically less than 10,000,000:1; preferably less than 1,000,000:1; and more preferably less than 500,000:1.

In a preferred embodiment, from 0.005 nmoles to 500 nmoles, preferably from 0.1 to 250 nmoles, and most preferably from 1 to 50 nmoles of the metathesis catalyst are charged to the reactor per 3 mmoles of renewable feedstream (such as TAGs, biodiesel, fatty acids, fatty acid esters, and/or fatty acid alkyl esters or mixtures thereof, preferably fatty acid esters) charged.

The process may be batch, semi-batch, or continuous. As used herein, the term "continuous" means a system that operates without interruption or cessation. For example, a continuous process to produce a metathesis product would be one where the reactants are continually introduced into one or more reactors and metathesis products are continually withdrawn.

The processes may be conducted in any of glass lined, stainless steel, or similar type reaction equipment. Useful reaction vessels include reactors (including continuous stirred tank reactors, batch reactors, reactive extruder, pipe, or pump, continuous flow fixed bed reactors, slurry reactors, fluidized bed reactors, and catalytic distillation reactors). The reaction zone may be fitted with one or more internal and/or external heat exchanger(s) in order to control undue temperature fluctuations, or to prevent "runaway" reaction temperatures.

If the process is conducted in a batch reactor, then the contacting time of the renewable feedstream and catalyst can be of any duration, provided that the desired olefin metathesis products are obtained. Generally, the contacting time in a reactor is greater than 5 minutes, and preferably greater than 10 minutes. Generally, the contacting time in a reactor is less than 25 hours, preferably less than 15 hours, and more preferably less than 10 hours.

If the process is conducted in a continuous flow reactor, then the weight hourly space velocity, given in units of grams feed material (preferably fatty acid ester and/or fatty acid alkyl ester) per gram catalyst per hour ($h^{-1}$), will determine the relative quantities of feed material to catalyst employed, as well as the residence time in the reactor of the unsaturated starting compound. In a continuous flow reactor, the weight hourly space velocity of the unsaturated feed material (preferably fatty acid ester and/or fatty acid alkyl ester) is typically greater than 0.04 g feed material (preferably fatty acid ester and/or fatty acid alkyl ester) per g catalyst per hour ($h^{-1}$), and preferably, greater than 0.1 $h^{-1}$.

In a preferred embodiment, the reactants (for example, metathesis catalyst; renewable feedstream; lower olefin, optional diluent, etc.) are combined in a reaction vessel at a temperature of 20 to 300° C. (preferably 20 to 200° C., preferably 30 to 100° C., preferably 40 to 60° C.) and an olefin (such as ethylene) at a pressure of 0.1 to 1000 psi (0.7 kPa to 6.9 MPa) (preferably 20 to 400 psi (0.14 MPa to 2.8 MPa), preferably 50 to 250 psi (0.34 MPa to 1.7 MPa)), if the olefin is present, for a residence time of 0.5 seconds to 48 hours (preferably 0.25 to 5 hours, preferably 30 minutes to 2 hours).

In certain embodiments, where the olefin is a gaseous olefin, the olefin pressure is greater than 5 psig (34.5 kPa), preferably, greater than 10 psig (68.9 kPa), and more preferably, greater than 45 psig (310 kPa). When a diluent is used with the gaseous olefin, the aforementioned pressure ranges may also be suitably employed as the total pressure of olefin and diluent. Likewise, when a liquid olefin is employed and the process is conducted under an inert gaseous atmosphere, then the aforementioned pressure ranges may be suitably employed for the inert gas pressure.

In a preferred embodiment, the process is typically a solution process, although it may be a bulk or high pressure process. Homogeneous processes are preferred. (A homogeneous process is defined to be a process where at least 90 wt % of the product is soluble in the reaction media.) A bulk homogeneous process is particularly preferred. (A bulk process is defined to be a process where reactant concentration in all feeds to the reactor is 70 vol % or more.) Alternately, no solvent or diluent is present or added in the reaction medium, (except for the small amounts used as the carrier for the catalyst or other additives, or amounts typically found with the reactants, e.g., propane in propylene).

In the process of this invention, the conversion of the renewable feedstream (preferably fatty acid ester) to the desired LAO and/or the AIUNO products can vary widely depending upon the specific reagents, such as, for example, the lower olefins, the specific metathesis catalyst, the specific process conditions employed, and the specific chemical makeup of the fatty acid ester. For the purpose of this invention, "conversion" is defined as the mole percentage of feed material that is converted to the desired cross-metathesis products, that is, LAOs or, alternatively, LAOs and AIUNOs. In some embodiments, the conversion of the renewable feedstream (preferably fatty acid ester) to LAOs is greater than 50 mol %, preferably greater than 60 mol %, preferably greater than 70 mol %. In other embodiments, the conversion of the renewable feedstream (preferably fatty acid ester) to LAOs and AIUNOs is greater than 50 mol %, preferably greater than 60 mol %, more preferably greater than 70 mol %.

In the process of this invention, the yields of the LAO and/or AIUNO can also vary depending upon the specific reagent olefins, catalyst, and process conditions employed. For the purposes of this invention, "yield" will be defined as the mole percentage of cross-metathesis products LAOs or LAOs and AIUNOs formed relative to the initial moles of renewable feedstream (such as fatty acid ester in the feed). In embodiments where the renewable feedstock comprises TAGs (as represented in the formula below):

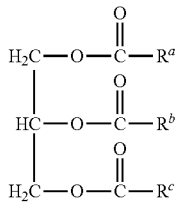

where $R^a$, $R^b$, and $R^c$ each, independently, represent a saturated or unsaturated hydrocarbon chain (preferably $R^a$, $R^b$, and $R^c$ each, independently, are a $C_{12}$ to $C_{28}$ alkyl or olefin, preferably $C_{16}$ to $C_{22}$ alkyl or olefin), the yield may be defined as defined by the mole percentage of LAOs formed relative to the initial moles of starting fatty acid ester (unsaturated $R^a$+moles of unsaturated $R^b$+moles of unsaturated $R^c$) introduced into the reactor. Alternatively, the yield may be defined by the mole percentage of LAOs and AIUNOs formed relative to the initial moles of starting fatty acid ester. In some embodiments, the yield of LAOs is greater than 30 mol % or more, preferably greater than 35 mol % or more, preferably greater than 40 mol % or more, preferably greater than 45 mol % or more, preferably greater than 50 mol % or more, preferably greater than 55 mol % or more, preferably greater than 60 mol % or more. In some embodiments, the yield of LAOs and AIUNOs is greater than 30 mol % or more, preferably greater than 35 mol % or more, preferably greater than 40 mol % or more, preferably greater than 45 mol % or more, preferably greater than 50 mol % or more, preferably greater than 55 mol % or more, preferably greater than 60 mol % or more.

For the purposes of this invention, "productivity" is defined to be the amount in grams of LAO produced per mmol of catalyst introduced into the reactor, per hour. In a preferred embodiment, the productivity of the process is at least 200 g of LAO (such as decene-1) per mmol of catalyst per hour, preferably at least 5000 g/mmol/hour, preferably at least 10,000 g/mmol/hour, preferably at least 300,000 g/mmol/hour.

For the purposes of this invention, "selectivity" is a measure of conversion of lower olefin and renewable feedstream to the cross-metathesis products, and is defined by the mole percentage of LAOs formed relative to the initial moles of lower olefin or renewable feedstream. In a preferred embodiment, the selectivity of the process is at least 20 wt % LAOS, based upon the weight of the material exiting the reactor, preferably at least 25 wt %, preferably at least 30 wt %, preferably at least 35 wt %, preferably at least 40 wt %, preferably at least 45 wt %, preferably at least 50 wt %, preferably at least 60 wt %, preferably at least 70 wt %, preferably at least 80 wt %, preferably at least 85 wt %, preferably at least 90 wt %, preferably at least 95 wt %.

For the purpose of this invention, "catalyst turnover number" (TON) is a measure of how active the catalyst compound is and is defined as the number of moles of cross-metathesis alpha-olefin product formed per mole of catalyst compound. In a preferred embodiment, the TON of the process is at least 5,000, preferably at least 10,000, preferably at least 50,000, preferably at least 100,000, preferably at least 1,000,000.

In a particular embodiment, a fatty acid or a fatty acid ester which is monosaturated may be cross-metathesized with a lower olefin in the presence of a suitable metathesis catalyst to produce a desired $C_4$ to $C_{40}$ LAO. For example, methyl oleate and ethylene may be cross-metathesized using a suitable metathesis catalyst to produce major cross-metathesis products of 1-decene and methyl-9-decanoate. Both products are alpha-olefins; however, the decanoate terminates in an ester moiety at the opposite end of the chain from the carbon-carbon double bond. In addition to the major products, the methyl oleate may self-metathesize to produce small amounts of 9-octadecene, a less desirable product, and dimethyl-9-octadecene-1,18-dioate, a second less desirable product.

In another embodiment, a diunsaturated fatty acid or a fatty acid ester may be cross-metathesized with a lower olefin in the presence of a suitable metathesis catalyst to produce a desired AIUNO. For example, methyl linoleate and ethylene may be cross-metathesized using a suitable metathesis catalyst to produce 1,4-decadiene and methyl-9-decanoate.

In yet other embodiments, mixtures of fatty acids, or fatty acid esters, or a natural oil comprising mixtures of monosaturated and polyunsaturated fatty acids and/or esters, or a mixture of natural oils may be cross-metathesized with a lower olefin in the presence of a suitable metathesis catalyst to produce a mixture of a desired LAO and a desired AIUNO. For example, a mixture of methyl oleate and methyl linoleate may be cross-metathesized with ethylene to produce a mixture of 1-decene and 1,4-decadiene. Similarly, a natural oil comprising a mixture of monounsaturated and polyunsaturated fatty acids and fatty acid esters may be cross-metathesized with a lower olefin to produce a mixture of desired LAO and at least one desired AIUNO. For example, palm oil which comprises about 39% oleic acids and esters and about 10% linoleic acids and esters, may be cross-metathesized with a suitable metathesis catalyst to produce a mixture of 1-hexene, 1-decene, and 1,4-decadiene, as shown in FIG. 2. The $C_{10}$ fraction comprising 1-decene and 1,4-decadiene may be obtained by fractional distillation, as shown in FIG. 2, and subsequently polymerized to give poly(1-decene)(1,4-decadiene), where x and y are, independently, 1 to 10,000; preferably 1 to 1,000; preferably 1 to 250; preferably 1 to 25. Alternatively, the $C_{7-10}$ fraction comprising 1-hexene, 1-decene, and 1,4-decadiene may be obtained by fractional distillation, as shown in FIG. 3, and subsequently polymerized to give poly(1-hexene)(1-decene)(1,4-decadiene), where x, y, and z are, independently, 1 to 10,000; preferably 1 to 1,000; preferably 1 to 250; preferably 1 to 25.

Copolymerization systems often require monomer feedstreams from different sources, and typically these feedstreams are independently fed to the polymerization reactor. Use of multiple feedstreams adds undesirable cost and complexity to copolymerization processes and systems. The use of a few, or even a single, monomer feedstream would reduce cost and streamline the polymerization system. Therefore, use of monomer feedstreams containing both LAOs and AIUNOs, as disclosed herein, would be very useful for developing low cost LAO-AIUNO copolymers from renewable feedstreams. Likewise, using a feedstream that does not have to be purified is also advantageous.

Removal of the metathesis catalyst from the metathesis mixture may be achieved by any means known in the art. In particular, the inventors have surprisingly discovered that the addition of a metal salt, in particular a silver or thallium salt, such as, for example silver triflate, and subsequent filtration through an adsorbant, such as neutral silica or neutral alumina, effectively removes the metathesis catalyst from the metathesis mixture. The metal salt may be any of those known to interact or react with the metathesis catalyst to produce a product that adsorbs to an adsorbant, such as, neutral alumina or silica. In some embodiments, the molar ratio of metal salt to metathesis catalyst is at least 0.5:1.0, at least 0.8:1.0, at least 1.0:1.0, at least 2.0:1.0. In some embodiments, the metal salt is preloaded onto the adsorbant, such as, neutral silica or neutral alumina. In some embodiments, the mass ratio of metal salt to adsorbant, such as, neutral silica or neutral alumina, is at least 1:1000, at least 1:100, at least 1:50, at least 1:10. In other embodiments, the filtration is conducted under an inert atmosphere.

Separation of the LAO and AIUNO from any undesired metathesis byproducts may be achieved by any means known in the art such as fractionation, distillation, or any other appropriate separation method. The LAO and AIUNO products from the metathesis reaction are then fed into the monomer feedstream for the production of LAO-AIUNO copolymers.

Polymerization of LAOs and AIUNOs to Produce LAO-AIUNO copolymers

This invention relates to a process to produce a LAO-AIUNO copolymer comprising contacting a feedstream comprising a mixture of at least one $C_4$ to $C_{40}$ LAO and at least AIUNO with a metallocene catalyst system, and wherein a LAO-AIUNO copolymer is produced.

In other embodiments, this invention also relates to an integrated process to produce a LAO-AIUNO copolymer comprising: contacting at least one renewable feedstream with at least one lower olefin in the presence of a metathesis catalyst, wherein a polymerization feedstream of a mixture of at least one $C_4$ to $C_{40}$ LAO and at least one AIUNO is produced; and contacting the polymerization feedstream with a metallocene catalyst system, wherein a LAO-AIUNO copolymer is produced.

Polymerization Feedstreams

LAOs and AIUNOs are monomers for LAO-AIUNO copolymers. LAOs and AIUNOs may be produced synthetically, by any means known in the art, including isolation or derivativization from nonrenewable feedstreams including natural gas, coal, and petroleum. Useful feedstocks include $C_4$-$C_{18}$ alpha-olefin sources derived from an ethylene growth process, from Fischer-Tropsch synthesis, from steam or thermal cracking processes, syn-gas synthesis, $C_4$ streams containing 1-butene from refinery operations, such as Raff-1 or Raff-2 stream, and so on, as described in WO 2007/011832. LAOs and AIUNOs may also be produced from renewable feedstreams including fatty acids, fatty acid esters, or natural oils, by metathesis with a lower olefin, as described above.

In some embodiments, $C_4$ to $C_{24}$ LAO monomers are preferably 1-butene, 1-pentene, 1-hexene, 1-heptene, 1-octene, 1-nonene, 1-decene, 1-undecene, 1-dodecene, and 1-tetradecene. In preferred embodiments, the $C_4$ to $C_{24}$ LAO monomers are selected from 1-butene, 1-heptene, and/or 1-decene. In some embodiments, the AIUNO monomers are preferably 1,4-hexadiene, 1,4-octadiene, 1,5-octadiene, 1,6-octadiene, 1,4-nonadiene, 1,5,-nonadiene, 1,6,-nonadiene, 1,7,-nonadiene, 1,4-decadiene, 1,5-decadiene, 1,6-decadiene, 1,7-decadiene, 1,4,7-decatriene, and/or 1,5,8-decatriene. In preferred embodiments, the AIUNO monomers are preferably 1,4-hexadiene or 1,4-decadiene.

In particular embodiments, multiple LAO and/or multiple AIUNO monomers are used. In other embodiments, a single LAO monomer and a single AIUNO monomer may be used. The LAO and AIUNO feedstreams may be combined before feeding into the reactor. Alternatively, the LAO monomer feedstream and the AIUNO feedstream may be separate before feeding into the reactor. In other embodiments, where multiple LAO monomers and/or multiple AIUNO monomers are used, each different monomer may be fed separately into the reactor.

In particular embodiments, where a renewable feedstream is employed, the LAO and AIUNO monomers may be transported in a single feedstream from the metathesis reactor into the polymerization reactor. Preferably, there is no need for removal of AIUNOs from the feedstream. In particular embodiments, depending on the preferred ratios of LAO and AIUNO mer units in the desired LAO-AIUNO copolymers, the feedstream into the polymerization reactor, containing a mixture of LAO and AIUNO monomers, may be spiked with the same LAO or AIUNO monomers. In other embodiments, depending on the preferred composition of LAO and AIUNO mer units in the desired LAO-AIUNO copolymers, the feedstream into the polymerization reactor, containing a mixture of LAO and AIUNO monomers, may be spiked with different LAO or AIUNO monomers.

Polymerization Catalysts

The inventors have surprisingly discovered that metallocene catalysts may be used to catalyze the polymerization of LAOs and AIUNOs (such as 1,4-dienes) to produce novel LAO-AIUNO copolymers. Internal olefins are considered to be inert where a metallocene is used as a catalyst for polymerization. Further, alpha, omega-dienes ($\alpha,\omega$-dienes) are known to typically yield cross-linked polymers. However, less is known about the incorporation and effect of 1,4-dienes in polymers, particularly in PAOs and PAO-derived materials.

Metallocene Catalyst System

The polymers described herein can be made in the presence of a metallocene catalyst system. The metallocene catalyst system comprises at least one metallocene catalyst, at least one activator, an optional co-activator, and an optional support. For the purpose of the present invention, the term "catalyst system" includes at least one metallocene catalyst and at least one activator. For the purpose of the present invention, the term "metallocene" contains a metal bonded to at least one ancillary ligand system, including unsubstituted or substituted, cyclopentadienyl ligands, heteroatom substituted, and/or heteroatom containing cyclopentadienyl ligands. The metallocene may be bridged or unbridged, and it may be meso-, racemic-, or metallocenes containing other symmetry groups. The terms "cocatalyst" and "activator" are used herein interchangeably and are defined to be any compound which can activate any one of the metallocene catalysts described above by converting the neutral catalyst compound to a catalytically active catalyst compound cation.

Metallocene Catalyst

In some embodiments, the catalyst compound is represented by the formulae:

$$L^A L^B MX_n \qquad (V); or$$

$$L^A A^* L^B MX_n, \qquad (VI);$$

where M is a Group 3 to 12 transition metal, preferably M is a Group 4, 5, or 6 transition metal, more preferably M is a Group 4 transition metal atom, even more preferably M is zirconium, hafnium, or titanium;

the ligands, $L^A$ and $L^B$, are open, acyclic or fused ring(s) or ring system(s), including unsubstituted or substituted, cyclopentadienyl ligands, heteroatom substituted and/or heteroatom containing cyclopentadienyl ligands;

each X is a leaving group;

A* is a bridging group; and n is 0, 1, or 2.

In one embodiment, $L^A$ and $L^B$ may be any ligand structure capable of $\pi$-bonding to M, for example cyclopentadiene, indene, fluorene, phenyl, benzyl, and the like. In another embodiment, $L^A$ and $L^B$ may comprise one or more heteroatoms, for example, nitrogen, silicon, boron, germanium, sulfur, and phosphorous, in combination with carbon atoms to form an open, acyclic, or preferably, a fused, ring or ring system, for example, a hetero-cyclopentadienyl ancillary ligand. Other $L^A$ and $L^B$ ligands include, but are not limited to, amides, phosphides, alkoxides, aryloxides, imides, carbolides, borollides, porphyrins, phthalocyanines, corrins, and other polyazomacrocycles. Independently, each $L^A$ and $L^B$ may be the same or different. In one embodiment of Formula V, only one of either $L^A$ or $L^B$ is present.

Each $L^A$ and $L^B$ may be independently unsubstituted or substituted with at least one R* substituent group, where substituted means that at least one (alternately at least 2, 3, 4, 5, 6, 7, 8, or 9) hydrogen group on $L^A$ and/or $L^B$ (e.g., cyclopentadiene, indene, fluorene, phenyl, benzyl, etc.) is replaced with R*. Non-limiting examples of substituent groups R* include one or more from the group selected from hydrogen, or linear, or branched alkyl radicals, alkenyl radicals, alkynyl radicals, cycloalkyl radicals, aryl radicals, acyl radicals, aryl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, arylamino radicals, or combination thereof. In a preferred embodiment, substituent groups R* have up to 50 non-hydrogen atoms, preferably from 1 to 30 carbon, that may also be substituted with halogens or heteroatoms or the like. Non-limiting examples of alkyl substituents R* include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl, and the like; and halocarbyl-substituted organometalloid radicals including tris(trifluoromethyl)silyl, methyl-bis(difluoromethyl)silyl, bromomethyldimethylgermyl, and the like; and disubstituted boron radicals including dimethylboron, for example; and disubstituted pnictogen radicals including dimethylamine, dimethylphosphine, diphenylamine, methylphenylphosphine, chalcogen radicals including methoxy, ethoxy, propoxy, phenoxy, methylsulfide, and ethylsulfide. Non-hydrogen substituents R* include the atoms carbon, silicon, boron, aluminum, nitrogen, phosphorous, oxygen, tin, sulfur, germanium, and the like, including olefins, such as, but not limited to, olefinically unsaturated substituents including vinyl-terminated ligands, for example, but-3-enyl, prop-2-enyl, hex-5-enyl, and the like. Also, in some embodiments, at least two R* groups, preferably two adjacent R groups, are joined to form a ring structure having from 3 to 30 atoms selected from carbon, nitrogen, oxygen, phosphorous, silicon, germanium, aluminum, boron, or a combination thereof. In other embodiments, R* may also be a diradical bonded to L at one end and forming a carbon sigma bond to the metal M. Particularly preferred R* substituent groups include a $C_1$ to $C_{30}$ hydrocarbyl, a heteroatom, or heteroatom containing group (preferably methyl, ethyl, propyl (including isopropyl, sec-propyl), butyl (including t-butyl and sec-butyl), neopentyl, cyclopentyl, hexyl, octyl, nonyl, decyl, phenyl, substituted phenyl, benzyl (including substituted benzyl), cyclohexyl, cyclododecyl, norbornyl, and all isomers thereof.

Non-limiting examples of ligands ($L^A$ and $L^B$) include cyclopentadienyl ligands, cyclopentaphenanthreneyl ligands, indenyl ligands, benzindenyl ligands, fluorenyl ligands, dibenzo[b,h]fluorenyl ligands, benzo[b]fluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, boratobenzene ligands, and the like, including hydrogenated versions thereof, for example tetrahydroindenyl ligands. Preferably, $L^A$ and $L^B$ are cyclopentadienyl ligands, indenyl ligands, benzindenyl ligands, and/or fluorenyl ligands.

Other ligands may be bonded to the metal M, such as at least one leaving group X. In one embodiment, X is a monoanionic ligand bonded to M. Depending on the oxidation state of the metal, the value for n is 0, 1, or 2 such that Formulae V and VI above represent a neutral ligand metallocene catalyst compound. Non-limiting examples of X leaving groups include weak bases, such as, carboxylates, dienes, hydrocarbyl radicals having from 1 to 20 carbon atoms, hydrides or halogens, and the like, or a combination thereof. In another embodiment, two or more Xs form a part of a fused ring or ring system. Other examples of X ligands include those substituents for R*, as described above, and including cyclobutyl, cyclohexyl, heptyl, tolyl, trifluoromethyl, tetramethylene (both X), pentamethylene (both X), methylidene (both X), methoxy, ethoxy, propoxy, phenoxy, bis(N-methylanilide), dimethylamide, dimethylphosphide radicals, and the like. Preferably, X is an alkyl group or a halide. More preferably, X is methyl or chloride.

In Formula VI, the bridging group A* bridges $L^A$ and $L^B$. Non-limiting examples of bridging group A* include bridging groups containing at least one Group 13 to 16 atom, often referred to as a divalent moiety, such as, but not limited to, at least one of a carbon, oxygen, nitrogen, silicon, aluminum, boron, germanium, and tin atom, or a combination thereof. Preferably, bridging group A* contains a carbon, silicon, or germanium atom, most preferably, A* contains at least one silicon atom or at least one carbon atom. The bridging group A* may also contain substituent groups R* as defined above including halogens and iron. Non-limiting examples of bridging group A* may be represented by R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, $R^B$, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', and R'$_2$C—PR'—CR'$_2$, where R' is hydrogen or a $C_1$-$C_{20}$ containing hydrocarbyl, substituted hydrocarbyl, halocarbyl, substituted halocarbyl, silylcarbyl, or germylcarbyl substituent and optionally two or more adjacent R' may join to form a substituted or unsubstituted, saturated, partially unsaturated, or aromatic, cyclic or polycyclic substituent. In one embodiment, the bridged metallocene catalyst compounds of Formula VI have two or more bridging groups A* (EP 664 301 B1).

In a preferred embodiment, the catalyst compound is represented by Formula VII:

$$L^A(A^*)_m L^B MX_n \qquad \text{(VII)};$$

where M is zirconium, hathium, or titanium;
the ligands, $L^A$ and $L^B$, are cyclopentadienyl, substituted cyclopentadienyl, indenyl, substituted indenyl, fluorenyl, or substituted fluorenyl;
each X is independently a monoanionic ligand selected from one of hydride; substituted or unsubstituted $C_1$ to $C_{30}$ hydrocarbyl; alkoxide; aryloxide; amide; halide; phosphide; and Group 14 organometalloids; or both Xs together may form an alkylidene or a cyclometallated hydrocarbyl or other dianionic ligand;
A* is a bridging group;
m is 0 or 1; and
n is 0, 1, or 2.

In some embodiments, $L^A$ and $L^B$ may be substituted with substituent groups R", and each group R" is, independently, a $C_1$ to $C_{30}$ hydrocarbyl, where the $C_1$ to $C_{30}$ hydrocarbyl is preferably aliphatic or aromatic. In some embodiments, R" is a $C_1$ to $C_{20}$ hydrocarbyl, $C_1$ to $C_{15}$ hydrocarbyl, $C_4$ to $C_{30}$ hydrocarbyl, $C_4$ to $C_{30}$ hydrocarbyl, $C_1$ to $C_8$ hydrocarbyl, and $C_4$ to $C_8$ hydrocarbyl. Non-limiting examples of R" include methyl, ethyl, propyl, butyl, pentyl, hexyl, cyclopentyl, cyclohexyl, benzyl, or phenyl groups and the like.

In some embodiments, where m is 1, A* bridges $L^A$ and $L^B$, and is selected from R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'— CR'$_2$CR'$_2$, R'$_2$C—NR'—CR'=CR', R'$_2$CR'$_2$C—NR'—CR'$_2$CR'$_2$, R'$_2$C—P=CR', and R'$_2$C—PR'—CR'$_2$, where R' is hydrogen or a $C_1$-$C_6$ containing hydrocarbyl, substituted hydrocarbyl, halocarbyl, substituted halocarbyl, silylcarbyl, or germylcarbyl substituents.

In another embodiment, the metallocene catalysts represented by Formula VIII are useful herein.

$$L^A A^* J^* MX_n \quad \text{(VIII)}$$

where $L^A$ is a substituted or unsubstituted ligand bonded to M;
each X is a leaving group bonded to M;
J* is a heteroatom containing ligand bonded to M;
A* is bonded to J* and $L^A$; and M, $L^A$, A*, X, and n are as defined above.

In Formula VIII, $L^A$, A*, and J* form a fused ring system. In Formula VIII, J* contains a heteroatom from Group 13 to 16, preferably, nitrogen, boron, sulfur, oxygen, aluminum, silicon, phosphorous, and tin. In some embodiments, J* contains a heteroatom with a coordination number of three from Group 15 or a heteroatom with a coordination number of two from Group 16. Preferably, J* contains a nitrogen, phosphorus, oxygen, or sulfur atom, with nitrogen being most preferred. Examples of these heteroatom-containing ligand metallocene catalyst compounds are described in WO 96/33202; WO 96/34021; WO 97/17379; WO 98/22486; EP-A1-0 874 005; U.S. Pat. Nos. 5,233,049; 5,539,124; 5,554,775; 5,637,660; 5,744,417; 5,756,611; and 5,856,258; all of which are incorporated herein by reference.

In preferred embodiment, the catalyst compound is represented by Formula IX:

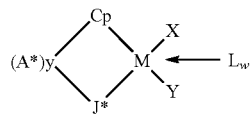

wherein:
M is Zr, Hf, or Ti;
Cp is a cyclopentadienyl ring;
J* is a Group 15 or 16 heteroatom;
each X is independently a monoanionic ligand selected from one of hydride; substituted or unsubstituted $C_1$ to $C_{30}$ hydrocarbyl; alkoxide; aryloxide; amide; halide or phosphide; Group 14 organometalloids; or both Xs together may form an alkylidene or a cyclometallated hydrocarbyl or other dianionic ligand;
y is 0 or 1; and when y=1, A* is a bridging group covalently bonded to both Cp and J;
L is an optional neutral Lewis base other than water, such as, an olefin, diolefin, aryne, amine, phosphine, ether, or sulfide, e.g., amines, phosphines, ethers, for example, diethylether, tetrahydrofuran, dimethylaniline, aniline, trimethylphosphine, and n-butylamine; and w is a number from 0 to 3;

As used in Formula IX, Cp includes cyclopentadiene ligands and their anologs capable of π-bonding to M, for example, Cp includes indene and fluorine. In some embodiments, Cp may be substituted with from zero to five substituted groups R*, when y is zero; and from one to four substituted groups R*, when y is one; and each substituted group R* comprises, independently, a radical selected from one of hydrocarbyl, silyl-hydrocarbyl or germyl-hydrocarbyl having from 1 to 30 carbon, silicon or germanium atoms, substituted hydrocarbyl, silyl-hydrocarbyl or germyl-hydrocarbyl radicals, wherein one or more hydrogen atoms may be replaced by one or more of a halogen radical, an amido radical, a phosphido radical, an alkoxy radical, an aryloxy radical or any radical containing a Lewis acidic or basic functionality; $C_1$ to $C_{30}$ hydrocarbyl-substituted metalloid radicals, wherein the metalloid is selected from one of Group 14 of the Periodic Table of Elements; halogen radicals; amido radicals; phosphido radicals; alkoxy radicals; or alkylborido radicals; or, Cp is a cyclopentadienyl ring in which at least two adjacent R*-groups may be joined together and along with the carbon atoms to which they may be attached, form a $C_4$ to $C_{20}$ ring system which may be saturated, partially unsaturated or aromatic, and/or substituted or unsubstituted, the substitutions being selected as one or more R* group, as defined above.

In some embodiments, J* may be substituted with one R' group when J* is a group 15 element, and y is one, or a group 16 element and y is zero; or with two R' groups when J* is a group 15 element and y is zero; or is unsubstituted when J* is a Group 16 element and y is one; and each R' group is, independently, a radical selected from: hydrocarbyl, silyl-hydrocarbyl or germyl-hydrocarbyl radicals having 1 to 30 carbon, silicon or germanium atoms; substituted hydrocarbyl, silyl-hydrocarbyl or germyl-hydrocarbyl radicals, wherein one or more hydrogen atoms is replaced by one or more of halogen radicals, amido radicals, phosphido radicals, alkoxy radicals, aryloxy radicals; or alkylborido radicals, preferably all R's are bonded to J* through a 1°, 2°, or aromatic carbon atom, and are not directly bonded to a silicon or germanium atom.

A* is as defined above, and in some embodiments, typically comprises at least one Group 13, 14, or 15 element such as carbon, silicon, boron, germanium, nitrogen or phosphorous with additional substituents R* as defined above, so as to complete the valency of the Group 13, 14 or 15 element(s).

In a preferred embodiment, M is Ti; X is chlorine, bromine, benzyl, phenyl, or a $C_1$ to $C_{12}$ alkyl group (such as, methyl, ethyl, propyl, butyl, hexyl, and octyl); y is 1; A* is a bridging group comprising carbon or silica, such as, dialkylsilyl, preferably A* is selected from $CH_2$, $CH_2CH_2$, $CH(CH_3)_2$, $SiMe_2$, SiPh$_2$, SiMePh, Si(CH$_2$)$_3$, (Ph)$_2$CH, (p-(Et)$_3$SiPh)$_2$CH and Si(CH$_2$)$_4$; J* is N—R', where R' is a C$_1$ to C$_{30}$ hydrocarbyl group, such as cyclododecyl, cyclohexyl, butyl (including t-butyl and sec-butyl), benzyl (including substituted benzyl), methyl, ethyl, hexyl, neopentyl, cyclopentyl, decyl, propyl (including isopropyl, sec-propyl), norbornyl, and phenyl (including substituted phenyl, such as 3-t-butylphenyl, 2-methylphenyl); and Cp is cyclopentadienyl, substituted cyclopentadienyl, indenyl, substituted indenyl, fluorenyl, or substituted fluorenyl. Two adjacent substitutions may form mononuclear or polynuclear rings.

Particularly useful catalyst compounds include: rac-dimethyl-silyl-bis(4,5,6,7-tetrahydroindenyl)zirconium dichloride or rac-dimethyl-silyl-bis(4,5,6,7-tetrahydroindenyl)zirconium dimethyl, rac-dimethyl-silyl-bis(indenyl)zirconium dichloride or rac-dimethyl-silyl-bis(indenyl)zirconium dimethyl, rac-ethylidene-bis(4,5,6,7-tetrahydroindenyl) zirconium dichloride or rac-ethylidene-bis(4,5,6,7-tetrahydroindenyl)zirconium dimethyl, rac-ethylidene-bis(indenyl) zirconium dichloride or rac-ethylidene-bis(indenyl) zirconium dimethyl, meso-dimethyl-silyl-bis(4,5,6,7-tetrahydroindenyl)zirconium dichloride or meso-dimethyl-silyl-bis(4,5,6,7-tetrahydroindenyl)zirconium dimethyl, meso-dimethyl-silyl-bis(indenyl)zirconium dichloride or meso-dimethyl-silyl-bis(indenyl)zirconium dimethyl, meso-ethylidene-bis(4,5,6,7-tetrahydroindenyl)zirconium dichloride or meso-ethylidene-bis(4,5,6,7-tetrahydroindenyl) zirconium dimethyl, meso-ethylidene-bis(indenyl)zirconium dichloride or meso-ethylidene-bis(indenyl)zirconium dimethyl. Other preferred single-site catalysts include the aforementioned racemic or meso catalysts with different degree of substituted indenyl ligands.

Other preferred metallocenes include the unbridged metallocenes, such as, bis(cyclopentadienyl)zirconium dichloride, bis(cyclopentadienyl)zirconium dimethyl, bis(1,2-dimethylcyclopentadienyl)zirconium dichloride, bis(1,2-dimethylcyclopentadienyl)zirconium dimethyl, bis(1,3-dimethylcyclopentadienyl)zirconium dichloride, bis(1,3-dimethylcyclo-pentadienyl)zirconium dimethyl, bis(1,2,3-trimethylcyclopentadienyl)zirconium dichloride, bis(1,2,3-trimethylcyclopentadienyl) zirconium dimethyl, bis(1,2,4-trimethylcyclopentadienyl) zirconium dichloride, bis(1,2,4-trimethylcyclopentadienyl)zirconium dimethyl, bis(1,2,3,4-tetramethylcyclopentadienyl) zirconium dichloride, bis(1,2,3,4-tetramethylcyclopentadienyl) zirconium dimethyl, bis (pentamethylcyclo-pentadienyl)zirconium dichloride, bis (pentamethyl-cyclopentadienyl) zirconium dimethyl, bis (propylcyclopentadienyl)hafnium dichloride, bis (propylcyclopentadienyl)hafnium dimethyl, and other substituted analogs.

Activators

Activators useful herein may be non-coordinating anion (NCA) activators or an alkyl aluminum compound such as methylaluminoxane (MAO). For purposes of this invention and the claims thereto, "non-coordinating anion" (NCA) is defined to mean an anion which either does not coordinate to the catalyst metal cation or that coordinates only weakly to the metal cation. An NCA coordinates weakly enough that a neutral Lewis base, such as, an olefinically or acetylenically unsaturated monomer, can displace it from the catalyst center. Any metal or metalloid that can form a compatible, weakly coordinating complex with the catalyst metal cation may be used or contained in the noncoordinating anion. Suitable metals include, but are not limited to, aluminum, gold, and platinum. Suitable metalloids include, but are not limited to, boron, aluminum, phosphorus, and silicon. A subclass of non-coordinating anions comprises stoichiometric activators, which can be either neutral or ionic. The terms "ionic activator," and "stoichiometric ionic activator" can be used interchangeably. Likewise, the terms "neutral stoichiometric activator" and "Lewis acid activator" can also be used interchangeably.

Non-limiting activators, for example, include alumoxanes, aluminum alkyls, ionizing activators (neutral or ionic), and conventional-type cocatalysts. Preferred activators typically include alumoxane compounds, modified alumoxane compounds, and ionizing anion precursor compounds that abstract one reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al(R$^1$)—O— subunits, where R$^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution of clear alumoxane can be decanted from the cloudy solution. Another alumoxane is a modified methyl alumoxane (MMAO) cocatalyst type 3A commercially available under the trade name Modified Methylalumoxane type 3A (Akzo Chemicals, Inc., Chicago, Ill.), covered under U.S. Pat. No. 5,041,584.

When the activator is an alumoxane (modified or unmodified), some embodiments select the maximum amount of activator at a 5000-fold molar excess Al/M over the catalyst (per metal catalytic site). The minimum activator-to-catalyst is a 1:1 molar ratio. Alternate preferred ranges include up to 500:1, alternately up to 200:1, alternately up to 100:1 alternately from 1:1 to 50:1.

It is within the scope of this invention to use activators represented by formulae below:

   (X)

or

   (XI)

or

   (XII)

In Formula X, n is 1 or 2. In Formula XI, n is 2 and m is a number from 1 to 10. In Formula XII, n is a number from 1 to 1000, preferably 1 to 100, more preferably 5 to 50, and even more preferably 5 to 25. (x+y)=the valence of M in Formula X. (x+y)=the valence of M-1 in Formula XI. (x+y)=valence of M-2 in Formula XII.

In Formulae X, XI, and XII, M is a Group 13 atom, preferably boron or aluminum, and more preferably aluminum. (JY) represents a heterocyclic ligand attached to M. In (JY), the Y represents a heterocyclic ligand and J represents at least one heteroatom contained in ligand JY. M may be bonded to any atom contained in Y, but is preferably bonded to heteroatom J. Preferably, J is an atom selected from Group 15 or 16 of the Period Table of the Elements, more preferably J is nitrogen, oxygen, or sulfur, and most preferably J is nitrogen. Non-limiting examples of (JY) include pyrrolyl, imidazolyl, pyrazolyl, pyrrolidinyl, purinyl, carbazolyl, and indolyl groups.

The heterocyclic ligand (JY) may be unsubstituted or substituted with one or a combination of substituent groups. Examples of suitably substituents include hydrogen, halogen, linear or branched alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. The substituent groups may also be substituted with halogens, particularly fluorine, or heteroatoms, or the like.

Non-limiting examples of substituents include methyl, ethyl, propyl, butyl, pentyl, hexyl, cyclopentyl, cyclohexyl, benzyl, or phenyl groups, and the like, including all their isomers, for example tertiary butyl, isopropyl, and the like. Other examples of substituents include fluoromethyl, fluoroethyl, difluoroethyl, iodopropyl, bromohexyl, and chlorobenzyl.

Preferably one or more positions on the heterocyclic ligand (JY) is substituted with a halogen atom or a halogen atom containing group, preferably the halogen is chlorine, bromine or fluorine, more preferably bromine or fluorine, and most preferably fluorine. Even more preferably, the substituent is a fluorine atom or a fluorinated aryl group, such as, a fluorinated phenyl group.

Each R' is independently a substituent group bonded to M. Non-limiting examples of substituent R' groups include hydrogen, linear or branched alkyl or alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic alkylene radicals, or combination thereof.

Each R' may be a methyl, ethyl, propyl, butyl, pentyl, hexyl, cyclopentyl, cyclohexyl, benzyl or phenyl group, including all their isomers, for example, tertiary butyl, isopropyl, and the like. Other suitable R' substituents may include hydrocarbyl radicals, such as, fluoromethyl, fluoroethyl, difluoroethyl, iodopropyl, bromohexyl, chlorobenzyl; hydrocarbyl substituted organometalloid radicals including trimethylsilyl, trimethylgermyl, methyldiethylsilyl, and the like; halocarbyl-substituted organometalloid radicals including tris(trifluoromethyl)-silyl, methyl-bis(difluoromethyl)silyl, bromomethyldimethylgermyl, and the like; disubstituted boron radicals including dimethylboron, for example; disubstituted pnictogen radicals including dimethylamine, dimethylphosphine, diphenylamine, methylphenylphosphine; and chalcogen radicals, including methoxy, ethoxy, propoxy, phenoxy, methylsulfide, and ethylsulfide.

Other R' substituents may include the atoms carbon, silicon, boron, aluminum, nitrogen, phosphorous, oxygen, tin, sulfur, or germanium, and the like. Substituent R' groups also include olefins, such as, but not limited to, olefinically unsaturated substituents including vinyl-terminated ligands, for example, but-3-enyl, prop-2-enyl, hex-5-enyl, and the like. Also, at least two R' groups, preferably two adjacent R' groups, may be joined to form a ring structure having from 3 to 30 atoms selected from carbon, nitrogen, oxygen, phosphorous, silicon, germanium, aluminum, boron, or a combination thereof. Also, a substituent group R' such as 1-butanyl may form a carbon bond to the metal M.

In one embodiment, each R' is a substituted or unsubstituted alkyl group, and/or a substituted or unsubstituted aryl group, and preferably each R' is an alkyl group containing 1 to 30 carbon atoms.

In a particular embodiment, in Formulae X, XI or XII, M is Al or B, preferably Al, J is a nitrogen atom contained in heterocyclic ligand Y and preferably (JY) is a substituted or unsubstituted indolyl group where the substituents are preferably hydrogen, halogen, an alkyl group, a halogenated or partially halogenated alkyl group, an aryl group, a halogenated or partially halogenated aryl group, an aryl substituted alkyl group, a halogenated or partially halogenated aryl substituted alkyl group, or combinations thereof, preferably J is bound to M, and R' a substituted or unsubstituted alkyl group, and/or a substituted or unsubstituted aryl group, preferably an alkyl group containing 1 to 30 carbon atoms.

In another particular embodiment, in Formulae X, XI or XII, M is Al or B, preferably Al, J is a nitrogen atom bonded to M and contained in a heterocyclic ligand Y where the heterocyclic ligand (JY) is an unsubstituted heterocyclic ligand. In another embodiment, one or more positions on the heterocyclic ligand is substituted with chlorine, bromine, and/or fluorine or with chlorine, bromine, and/or fluorine containing groups, more preferably with fluorine or fluorine containing groups, and R' is a substituted or unsubstituted alkyl group, and/or a substituted or unsubstituted aryl group, preferably an alkyl group containing 1 to 30 carbon atoms. In another embodiment, (JY) is a perhalogenated ligand.

In another particular embodiment, in Formulae X, XI or XII, M is Al or B, preferably Al, J is a nitrogen atom bonded to M and contained in a heterocyclic ligand Y where the heterocyclic ligand (JY) is an unsubstituted heterocyclic ligand. In another embodiment, one or more positions on the heterocyclic group is substituted with a halogen, such as, chlorine, bromine, and/or fluorine atoms, or with a halogen atom, such as, a chlorine, bromine, and/or fluorine containing groups. More preferably, the heterocyclic group is substituted with fluorine or fluorine containing groups. In another embodiment, at least one R' is bonded to a support material, preferably a silica support material.

It is also within the scope of this invention to use an ionizing or stoichiometric activator, neutral or ionic non-coordinating anion (as defined in U.S. Patent Publication No. 2009-0318644), such as, tri(n-butyl) ammonium tetrakis (pentafluorophenyl) borate, a tris perfluorophenyl boron metalloid precursor, or a tris perfluoronapthyl boron metalloid precursor, polyhalogenated heteroborane anions (WO 98/43983), boric acid (U.S. Pat. No. 5,942,459), or a combination thereof. It is also within the scope of this invention to use neutral or ionic activators alone or in combination with alumoxane or modified alumoxane activators. Preferably, the activator is N,N-dimethylanilinium tetrakis(perfluoronapthyl) borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis (perfluoronapthyl) borate, triphenylcarbenium tetrakis (perfluorobiphenyl)borate, triphenylcarbenium tetrakis(3,5-bis(trifluoromethyl)phenyl)borate, triphenylcarbenium tetrakis(perfluorophenyl) borate, or N,N-dimethylanilinium tetrakis(pentafluorophenyl)borate. The more preferred activator is N,N-dimethylanilinium tetrakis(pentafluorophenyl) borate. For additional activators useful herein, please see U.S. Patent Publication No. 2009-0318644.

The typical NCA activator-to-catalyst-precursor ratio is a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is within the scope of this invention that catalysts can be combined with one or more activators or activation methods described above. For example, a combination of activators have been described in U.S. Pat. Nos. 5,153,157 and 5,453,410; European publication EP-B1 0573120; and PCT publications WO 94/07928 and WO 95/14044. These documents all discuss the use of an alumoxane in combination with an ionizing activator.

Co-Activators

It is within the scope of this invention to use a co-activator. Aluminum alkyl or organoaluminum compounds which may be utilized as co-activators (or scavengers) include trimethylaluminum, triethylaluminum, triisobutylaluminum, tri-n-hexylaluminum, tri-n-octylaluminum, tri-iso-octylaluminum, triphenylaluminum, diethyl zinc, and the like.

Support Materials

In some embodiments, the metallocene catalyst system may comprise an inert support. The inert support is typically a porous solid support, such as, talc, inorganic oxides and resinous support materials, such as, polyolefin. Preferably, the support material is an inorganic oxide in a finely divided form. Suitable inorganic oxide materials for use in metallocene catalyst systems herein include Groups 2, 4, 13, and 14 metal oxides, such as, silica, alumina, and mixtures thereof. Other inorganic oxides that may be employed either alone or in combination with the silica or alumina are magnesia, titania, zirconia, and the like. Other suitable support materials, however, can be employed, for example, finely divided functionalized polyolefins, such as, finely divided polyethylene. Preferred supports include $Al_2O_3$, $ZrO_2$, $SiO_2$, and combinations thereof, more preferably $SiO_2$, $Al_2O_3$, or $SiO_2/Al_2O_2$.

In particular embodiments herein, the metallocene catalyst system comprises rac-dimethyl-silyl-bis(indenyl)zirconium dimethyl, N,N-dimethylanilinium tetrakispentafluorophenyl borate, and triisobutylaluminum. However, one of skill in the art will appreciate that the components of the metallocene catalyst system may be tailored to achieve a desired polymer product.

Polymerization Processes and Systems

As above, this invention relates to a process to produce a LAO-AIUNO copolymer comprising contacting a feedstream comprising a mixture of at least one $C_4$ to $C_{40}$ LAO and at least one AIUNO with a metallocene catalyst system, and wherein a LAO-AIUNO copolymer is produced.

This invention also relates to an integrated process to produce a LAO-AIUNO copolymer comprising: contacting at least one renewable feedstream with at least one lower olefin in the presence of a metathesis catalyst, wherein a polymerization feedstream of a mixture of at least one $C_4$ to $C_{40}$ LAO and at least one AIUNO is produced; and contacting the polymerization feedstream with a metallocene catalyst system, wherein a LAO-AIUNO copolymer is produced. For example, palm oil, which comprises about 39% oleic acids and esters and about 10% linoleic acids and esters, may be cross-metathesized with a suitable metathesis catalyst to produce a polymerization stream of a mixture of 1-decene and 1,4-decadiene, which may in turn be contacted with a metallocene catalyst system to produce poly(1-decene)(1,4-decadiene), as shown in FIG. 2.

In some embodiments, the contacting of at least one renewable feedstream with at least one lower olefin in the presence of a metathesis catalyst, wherein a mixture of at least one $C_4$ to $C_{40}$ linear alpha-olefin and at least one alpha, internally unsaturated, nonconjugated olefin is produced, and the contacting of the mixture with a metallocene catalyst system occur in a series of reactors.

The process may be a homogeneous process, preferably a bulk process. In a preferred embodiment, LAOs (such as 1-decene) and AIUNOs (such as 1,4-decadiene) may be polymerized in the presence of a metallocene catalyst system (comprising metallocene compound(s), one or more activators, and an optional support). Other additives may also be used, as desired, such as, scavengers and/or hydrogen. Any conventional suspension, homogeneous bulk, solution, slurry, or high-pressure polymerization process can be used. Such processes can be run in a batch, semi-batch, or continuous mode. Such processes and modes are well known in the art. Homogeneous polymerization processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 vol % or more.) Alternately, no solvent or diluent is present or added in the reaction medium, (except for the small amounts used as the carrier for the catalyst system or other additives, or amounts typically found with the monomer).

Suitable diluents/solvents for polymerization include non-coordinating, inert liquids. Examples include straight and branched-chain hydrocarbons, such as, isobutane, butane, pentane, isopentane, hexanes, isohexane, heptane, octane, dodecane, and mixtures thereof; cyclic and alicyclic hydrocarbons, such as, cyclohexane, cycloheptane, methylcyclohexane, methylcycloheptane, and mixtures thereof, such as can be found commercially (for example Isopar™); perhalogenated hydrocarbons, such as, perfluorinated $C_{4-10}$ alkanes, chlorobenzene, and aromatic and alkylsubstituted aromatic compounds, such as, benzene, toluene, mesitylene, and xylene. Suitable solvents also include liquid olefins which may act as monomers or comonomers including ethylene, propylene, 1-butene, 1-hexene, 1-pentene, 1-octene, and 1-decene. Mixtures of the foregoing are also suitable.

In a preferred embodiment, the feed concentration of the monomers for the polymerization is 60 vol % solvent or less, preferably 40 vol % or less, preferably 20 vol % or less, based on the total volume of the feedstream. Preferably, the polymerization is run in a bulk process. Suitable additives to the polymerization process can include one or more scavengers, promoters, chain transfer agents, chain shuttle agents, modifiers, reducing agents, oxidizing agents, hydrogen, aluminum alkyls, or silanes.

In some embodiments, the productivity, as defined previously, is at least 4500 g/mmol/hour, preferably 5000 or more g/mmol/hour, preferably 10,000 or more g/mmol/hr, preferably 50,000 or more g/mmol/hr. In an alternate embodiment, the productivity is at least 80,000 g/mmol/hr, preferably at least 150,000 g/mmol/hr, preferably at least 200,000 g/mmol/hr, preferably at least 250,000 g/mmol/hr, preferably at least 300,000 g/mmol/hr.

Polymerizations can be run at typical temperatures and/or pressures, such as, from 25 to 150° C., preferably 40 to 120° C., preferably 45 to 80° C., and preferably from 0.35 to 10 MPa, preferably from 0.45 to 6 MPa, preferably from 0.5 to 4 MPa. In a typical polymerization, the residence time of the reaction is up to 60 minutes, preferably between 5 to 50 minutes, preferably 10 to 40 minutes.

The polymerization product is a LAO-AIUNO copolymer, as described above, comprising at least one $C_4$ to $C_{40}$ LAO and at least one AIUNO monomer, wherein the LAO-AIUNO copolymer comprises at least one pendant chain; and wherein the at least one pendant chain has at least one internal site of unsaturation. This LAO-AIUNO copolymer may be used as is in additives and base stocks for lubricants. Additionally, the unsaturation present in the pendant chains provides a unique opportunity to add deliberate functionality, and/or to derivatize the LAO-AIUNO copolymer.

Functionalization and Derivatization

The LAO-AIUNO copolymers disclosed herein may further be functionalized by any suitable method. Typically, the olefin in the pendant group of the LAO-AIUNO copolymer may be reacted with a heteroatom containing group, or with another olefin containing a heteroatom containing group, with or without a catalyst. Examples of functionalization reactions include catalytic hydrosilylation, ozonolysis, hydroformylation, or hydroamination, sulfonation, halogenation, hydrohalogenation, hydroboration, epoxidation, or Diels-Alder reactions with polar dienes, Friedel-Crafts reactions with polar aromatics, maleation with activators, such as, free radical generators (e.g., peroxides), and metathesis with other olefins. In some embodiments the LAO-AIUNO copolymers produced herein are functionalized as described in U.S. Pat. No. 6,022,929; A. Toyota, T. Tsutsui, and N. Kashiwa, Polymer Bulletin 48, 213-219, 2002; and J. Am. Chem. Soc., 1990, 112, 7433-7434.

In preferred embodiments, the LAO-AIUNO copolymers of the present invention can be functionalized with one or more heteroatom containing group, typically containing heteroatoms such as P, O, S, N, Br, Cl, F, I, and/or Br (preferably N, O, Cl, and/or Br, preferably N and/or O). Preferred heteroatom containing groups include, amines, aldehydes, alcohols, acids, esters, anhydrides, sulfonates, oxycarbonyls, carbonyls, formyls, formylcarbonyls, hydroxyls, and acetyl halide, particularly succinic acid, maleic acid, and maleic anhydride.

More specifically, LAO-AIUNO copolymers may be functionalized with mono- or dicarboxylic acid material, i.e., acid, anhydride, salt, or acid ester. For example, the LAO-AIUNO copolymer may be reacted with a monounsaturated carboxylic reactant comprising at least one of (i) monounsaturated $C_4$ to $C_{10}$ dicarboxylic acid; (ii) derivatives of (i), such as, anhydrides or $C_1$ to $C_5$ alcohol derived mono- or diesters of (i); (iii) monounsaturated $C_3$ to $C_{10}$ monocarboxylic acid wherein the carbon-carbon double bond is conjugated to the carboxyl group, i.e., of the structure —C=C—C(O)— (where 0 is double bonded to C); and (iv) derivatives of (iii), for example, $C_1$ to $C_5$ alcohol derived monoesters. Upon reaction with the LAO-AIUNO copolymer, the double bond of the monounsaturated carboxylic reactant becomes saturated. Thus, for example, maleic anhydride reacted with the LAO-AIUNO copolymer becomes succinic anhydride, and acrylic acid becomes a propionic acid.

In particular embodiments, the LAO-AIUNO copolymer may be functionalized by contacting the LAO-AIUNO copolymer with an olefin comprising a heteroatom containing group in the presence of a metathesis catalyst, under appropriate metathesis conditions, such as those disclosed in U.S. Ser. No. 12/488,093, filed on Jun. 19, 2009.

The functionalized LAO-AIUNO copolymer can in turn be derivatized with a derivatizing compound. (For purposes of this invention and the claims thereto, the term "functionalized LAO-AIUNO copolymer" encompasses derivatized LAO-AIUNO copolymer.) The derivatizing compound can react with the functional groups of the functionalized LAO-AIUNO copolymer by any means known in the art, such as nucleophilic substitution, Mannich Base condensation, and the like. The derivatizing compound can be polar and/or contain reactive derivative groups. Preferred derivatizing compounds are selected from hydroxy containing compounds, amines, metal salts, anhydride containing compounds, and acetyl halide containing compounds. The derivatizing compounds can comprise at least one nucleophilic group and preferably at least two nucleophilic groups. A typical derivatized LAO-AIUNO copolymer is made by contacting a functionalized LAO-AIUNO copolymer, i.e., substituted with a carboxylic acid/anhydride or ester, with a nucleophilic reagent, e.g., amine, alcohol, including polyols, amino alcohols, reactive metal compounds, and the like. (For more information, please see U.S. Pat. No. 6,022,929 column 33, line 27 to column 74, line 63.) Alternately a derivatized LAO-AIUNO copolymer may be made by contacting a functionalized LAO-AIUNO copolymer, substituted with a carboxylic acid/anhydride or ester, with a nucleophilic reagent, e.g., amine, to make a quaternary ammonium compound, or amine oxide.

Integrated Systems for the Production of LAO-AIUNO copolymers

In some embodiments, the invention herein relates to an integrated system for the production of a LAO-AIUNO copolymer comprising (1) a metathesis reactor for the metathesis of a renewable feedstream to produce a mixture of LAOs and AIUNOs; (2) a fractionating column for the separation of desired fractions (such as comprising LAOs and AIUNOs) from the metathesis product mixture; and (3) a polymerization reactor equipped with a metallocene catalyst system for the polymerization of LAOs and AIUNOs to produce LAO-AIUNO copolymers, wherein all the components of the system are in fluid communication with each other.

As used herein, a "reactor" is any container(s) in which a chemical reaction occurs. For example, a metathesis reactor is one in which a metathesis reaction occurs, a polymerization reactor is one in which a polymerization reaction occurs, an esterification reactor is one in which esterification occurs, and a functionalization reactor is one in which functionalization occurs.

In some embodiments, the integrated system may further comprise an esterification reactor, located before the metathesis reactor, wherein the renewable feedstream is esterified to produce fatty acid esters useful in the subsequent metathesis reaction step.

The metathesis reactor is equipped with a metathesis catalyst, as described above, for the metathesis of a renewable feedstream to produce a mixture of LAOs and AIUNOs. The metathesis reactor comprises a metathesis catalyst, lower olefin, optional diluent, and monomers. In a preferred embodiment, the reactants (for example, metathesis catalyst, renewable feedstream, lower olefin, optional diluent, etc.) are combined in the metathesis reactor at a temperature of 20 to 300° C. (preferably 20 to 200° C., preferably 30 to 100° C., preferably 40 to 60° C.) for a residence time of 0.5 seconds to 48 hours (preferably 0.25 to 5 hours, preferably 30 minutes to 2 hours). The metathesis reactor also has an inflow of renewable feedstream and lower olefin. After the completion of the metathesis reaction, the metathesis product is optionally transferred to a catalyst removal column, and subsequently transferred to a fractionating column.

The optional catalyst removal column serves to remove the metathesis catalyst before additional processing of the metathesis products. In some embodiments, a metal salt, in particular a silver or thallium salt, such as, for example silver triflate, may be added to the metathesis mixture and the mixture subsequently filtered through an adsorbant, such as, neutral silica or neutral alumina to effectively remove the metathesis catalyst from the metathesis mixture. The metal salt may be any of those known to interact or react with the metathesis catalyst to produce a product that adsorbs to an adsorbant, such as, neutral alumina or silica. In some embodiments, the molar ratio of metal salt to metathesis catalyst is at least 0.5:1.0, at least 0.8:1.0, at least 1.0:1.0, at least 2.0:1.0. In some embodiments, the metal salt is preloaded onto the adsorbant, such as, neutral silica or neutral alumina. In some embodiments, the mass ratio of metal salt to adsorbant, such as, neutral silica or neutral alumina, is at least at least 1:1000, at least 1:100, at least 1:50, at least 1:10. In other embodiments, the filtration is conducted under an inert atmosphere. The purified metathesis product mixture is then transferred to a fractionating column.

The fractionating column separates the desired LAO and AIUNO fraction from the byproducts by using conventional fractional distillation techniques. The distilled fraction is transferred to the polymerization reactor.

The polymerization reactor system is equipped with a metallocene catalyst system, as described above, for the polymerization LAOs and AIUNOs to produce LAO-AIUNO copolymers. The polymerization reactor comprises a polymerization catalyst system, optional diluent, and monomers. In a preferred embodiment, the reactants (for example, polymerization catalyst system, metathesis products (LAOs and AIUNOs), optional diluent, etc.) are combined in the polymerization reactor at typical temperatures and/or pressures, such as, from 25 to 150° C., preferably 40 to 120° C., preferably 45 to 80° C., and preferably from 0.35 to 10 MPa, preferably from 0.45 to 6 MPa, preferably from 0.5 to 4 MPa. In a typical polymerization, the residence time of the reaction is up to 60 minutes, preferably between 5 to 50 minutes, preferably between 10 to 40 minutes. After the completion of the polymerization step, the LAO-AIUNO copolymer may be further processed for use in additives and base stock for lubricants.

In some embodiments, the polymerization reactor has an outflow to a functionalization reactor. A useful functionalization reactor may be equipped with a metathesis catalyst for the functionalization of the LAO-AIUNO copolymer to produce a functionalized branched polyalphaolefin. The functionalization reactor has an inflow of reactant olefin. The LAO-AIUNO copolymer is contacted with the reactant olefin, in the presence of a metathesis catalyst, under appropriate conditions, to produce a functionalized branched polyalphaolefin. After completion of the functionalization step, the functionalized branched polyalphaolefin may be further processed for use in additives and base stock for lubricants. An example of the integrated system of the present invention is shown in FIG. 4.

It is within the scope of this invention that the metathesis and polymerization processes may occur in a series of reactors, as shown in FIG. 4, or in a single reactor. For example, the metathesis and polymerization processes may occur in a single reactor with multiple reaction zones, such as, a slurry loop reactor or a tubular reactor. In some embodiments, the reaction zone for the metathesis reaction is separated from the reaction zone for the polymerization reaction. In other embodiments, the reaction zone for the metathesis reaction is separated from the reaction zone for the polymerization reaction by a neutralization zone, wherein compounds and catalysts poisonous or undesirably reactive to the subsequent process are removed or neutralized. For example, the neutralization zone may comprise a bed of neutral silica or neutral alumina impregnated with a metal salt, such as, silver triflate, to remove the metathesis catalyst before polymerization with a metallocene catalyst system.

Uses of PAOs

PAOs are often used as additives and base stocks for lubricants, among other things. Additional information on the use of PAOs in the formulations of full synthetic, semi-synthetic or part synthetic lubricant or functional fluids can be found in "Synthetic Lubricants and High-Performance Functional Fluids", 2nd Ed. L. Rudnick, et al., Marcel Dekker, Inc., N.Y. (1999). Additional information on additives used in product formulation can be found in "Lubricants and Lubrications", Ed. By T. Mang and W. Dresel, by Wiley-VCH GmbH, Weinheim 2001. The LAO-AIUNO copolymers, functionalized LAO-AIUNO copolymers and/or derivatized LAO-AIUNO copolymers have uses as oil additives, as anti-fogging or wetting additives, adhesion promoters, and many other applications. Preferred uses include additives for lubricants and/or fuels which can act as dispersants, viscosity index improvers, or multifunctional viscosity index improvers. (For more information, please see U.S. Pat. No. 6,022,929.) Other uses of the functionalized LAO-AIUNO copolymers include plasticizers, surfactants for soaps, detergents, fabric softeners, antistatics, disinfectants (functionalized amines), wetting agents, and so on.

The functionalized LAO-AIUNO copolymers and/or derivatized LAO-AIUNO copolymers, described herein, may be combined with other additives (such as viscosity index improvers, corrosion inhibitor, oxidation inhibitor, dispersant, lube oil flow improver, detergents, demulsifiers, rust inhibitors, pour point depressant, anti-foaming agents, anti-wear agents, seal swellant, friction modifiers, and the like, described, for example, in U.S. Pat. No. 6,022,929 at columns 60, line 42-column 78, line 54 and the references cited therein) to form compositions for many applications, including, but not limited to, lube oil additive packages, lube oils, and the like.

In another embodiment, this invention relates to:

1. A process to produce a poly(alpha-olefin)(alpha, internally unsaturated, nonconjugated olefin) comprising:
   contacting a feedstream comprising a mixture of at least one $C_4$ to $C_{40}$ linear alpha-olefin and at least one alpha, internally unsaturated, nonconjugated olefin with a metallocene catalyst system; and
   wherein a poly(alpha-olefin)(alpha, internally unsaturated, nonconjugated olefin) is produced.

2. The process of paragraph 1, wherein the mixture of at least one $C_4$ to $C_{40}$ linear alpha-olefin and at least one alpha, internally unsaturated, nonconjugated olefin is produced by contacting at least one renewable feedstream with at least one lower olefin in the presence of a metathesis catalyst.

3. The process of paragraph 2, wherein the at least one renewable feedstream is selected from canola oil, corn oil, soybean oil, rapeseed oil, algae oil, peanut oil, mustard oil, sunflower oil, tung oil, tall oil, perilla oil, grapeseed oil, linseed oil, safflower oil, pumpkin oil, palm oil, Jatropha oil, high-oleic soybean oil, high-oleic safflower oil, high-oleic sunflower oil, mixtures of animal and vegetable fats and oils, beef tallow, castor bean oil, dehydrated castor bean oil, cucumber oil, poppyseed oil, flaxseed oil, lesquerella oil, walnut oil, cottonseed oil, meadowfoam, tuna oil, sesame oils, waste oils/greases, and mixtures thereof.

4. The process of any of paragraphs 2 to 3, wherein the at least one lower olefin is at least one of ethylene, propylene, butene, butadiene, and isomers thereof.

5. The process of any of paragraphs 1 to 4, wherein the at least one $C_4$ to $C_{40}$ linear alpha-olefin (preferably $C_5$ to $C_{35}$, preferably $C_6$ to $C_{30}$, preferably $C_7$ to $C_{28}$, preferably $C_8$ to $C_{25}$, preferably $C_9$ to $C_{20}$, preferably $C_{10}$ to $C_{20}$ LAO) is selected from 1-butene, 1-pentene, 1-hexene, 1-heptene, 1-octene, 1-nonene, 1-decene, 1-undecene, 1-dodecene, and 1-tetradecene; and/or wherein the at least one alpha, internally unsaturated, nonconjugated olefin is selected from 1,4-hexadiene, 1,4-octadiene, 1,5-octadiene, 1,6-octadiene, 1,4-nonadiene, 1,5,-nonadiene, 1,6,-nonadiene, 1,7,-nonadiene, 1,4-decadiene, 1,5-decadiene, 1,6-decadiene, 1,7-decadiene, 1,4,7-decatriene, and 1,5,8-decatriene.

6. The process of any of paragraphs 2 to 5, wherein the metathesis catalyst comprises an organometallic compound of tungsten, molybdenum, ruthenium, tantalum, or rhenium (preferably Grubbs Catalyst, first generation; Grubbs Catalyst, second generation; Hoveyda-Grubbs Catalyst, first generation; Hoveyda-Grubbs Catalyst; 2-(2,6-diethylphenyl)-3,5,5,5-tetramethylpyrrolidine[2-(i-propoxy)-5-(N,N-dimethylaminosulfonyl)phenyl]methylene ruthenium dichloride; 2-(mesityl)-3,3,5,5-tetramethylpyrrolidine[2-(i-propoxy)-5-(N,N-dimethylaminosulfonyl)phenyl]methylene ruthenium dichloride; 2-(2-isopropyl)-3,3,5,5-tetramethylpyrrolidine[2-(i-propoxy)-5-(N,N-dimethylaminosulfonyl)phenyl]methylene ruthenium dichloride; 2-(2,6-diethyl-4-fluorophenyl)-3,3,5,5-tetramethylpyrrolidine [2-(1-propoxy)-5-(N,N-dimethylaminosulfonyl)phenyl]methylene ruthenium dichloride; 2-(1-propoxy)-5-(N,N-dimethylaminosulfonyl)phenylmethylene(1-cyclohexylmethyl-3-(2,6-diisopropylphenyl)-4,5-dihydro-1H-imidazole) ruthenium (II) chloride and (1-mesityl-3-methyl-2H-4,5-dihydroimidazol-2-ylidene)(tricyclohexylphosphine)-3-phenyl-1H-inden-1-ylidene ruthenium (II) dichloride).

7. The process of any of paragraphs 2 to 6, further comprising contacting the mixture with a metal salt and filtering the mixture through an adsorbant to remove the metathesis catalyst, before contacting with the metallocene catalyst system.

8. The process of any of paragraphs 1 to 7, wherein the metallocene catalyst system comprises at least one activator selected from alumoxane, N,N-dimethylanilinium tetrakis(perfluoronapthyl)borate, N,N-dimethylanilinium tetrakis(perfluorobiphenyl)borate, N,N-dimethylanilinium tetrakis(3,5-bis(trifluoromethyl)phenyl)borate, triphenylcarbeniumtetrakis(perfluoronapthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, and N,N-dimethylanilinium tetrakis(pentafluorophenyl)borate (preferably N,N-dimethylanilinium tetrakispentafluorophenyl borate).

9. The process of any of paragraphs 1 to 8, wherein the metallocene catalyst system comprises at least one co-activator selected from trimethylaluminum, triethylaluminum, triisobutylaluminum, tri-n-hexylaluminum, diethyl zinc, and tri-n-octylaluminum.

10. The process of any of paragraphs 1 to 9, wherein the metallocene catalyst system comprises at least one metallocene catalyst of the formula,

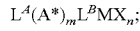

wherein M is zirconium, hathium, or titanium;

$L^A$ and $L^B$, are cyclopentadienyl, substituted cyclopentadienyl, indenyl, substituted indenyl, fluorenyl, or substituted fluorenyl ligands;

each X is independently a monoanionic ligand selected from one of hydride; substituted or unsubstituted $C_1$ to $C_{30}$ hydrocarbyl; alkoxide; aryloxide; amide; halide; phosphide; and Group 14 organometalloids; or both Xs together may form an alkylidene or a cyclometallated hydrocarbyl or other dianionic ligand;

A* is a bridging group;

m is 0 or 1; and n is 0, 1, or 2 (preferably the metallocene is selected from rac-dimethyl-silyl-bis(4,5,6,7-tetrahydroindenyl)zirconium dichloride, rac-dimethyl-silyl-bis(4,5,6,7-tetrahydroindenyl) zirconium dimethyl, rac-dimethyl-silyl-bis(indenyl)zirconium dichloride or rac-dimethyl-silyl-bis(indenyl)zirconium dimethyl, rac-ethylidene-bis(4,5,6,7-tetrahydroindenyl) zirconium dichloride, rac-ethylidene-bis(4,5,6,7-tetrahydroindenyl)zirconium dimethyl, rac-ethylidene-bis(indenyl)zirconium dichloride or rac-ethylidene-bis(indenyl)zirconium dimethyl, meso-dimethyl-silyl-bis(4,5,6,7-tetrahydroindenyl)zirconium dichloride, meso-dimethyl-silyl-bis(4,5,6,7-tetrahydroindenyl)zirconium dimethyl, meso-dimethyl-silyl-bis(indenyl)zirconium dichloride, meso-dimethyl-silyl-bis(indenyl)zirconium dimethyl, meso-ethylidene-bis(4,5,6,7-tetrahydroindenyl)zirconium dichloride, meso-ethylidene-bis(4,5,6,7-tetrahydroindenyl) zirconium dimethyl, meso-ethylidene-bis(indenyl)zirconium dichloride, meso-ethylidene-bis(indenyl)zirconium dimethyl, bis(cyclopentadienyl)zirconium dichloride, bis(cyclopentadienyl)zirconium dimethyl, bis(1,2-dimethylcyclopentadienyl)zirconium dichloride, bis(1,2-dimethylcyclopentadienyl)zirconium dimethyl, bis(1,3-dimethylcyclopentadienyl)zirconium dichloride, bis(1,3-dimethylcyclo-pentadienyl)zirconium dimethyl, bis(1,2,3-trimethylcyclopentadienyl)zirconium dichloride, bis(1,2,3-trimethylcyclopentadienyl) zirconium dimethyl, bis(1,2,4-trimethylcyclopentadienyl) zirconium dichloride, bis(1,2,4-trimethylcyclopentadienyl)zirconium dimethyl, bis(1,2,3,4-tetramethylcyclopentadienyl) zirconium dichloride, bis(1,2,3,4-tetramethylcyclopentadienyl) zirconium dimethyl, bis(pentamethylcyclo-pentadienyl)zirconium dichloride, bis(pentamethyl-cyclopentadienyl) zirconium dimethyl, bis(propylcyclopentadienyl)hafnium dichloride, and bis(propylcyclopentadienyl)hafnium dimethyl (preferably rac-dimethyl-silyl-bis(indenyl)zirconium dimethyl)).

11. The process of any of paragraphs 1 to 10, further comprising functionalizing the poly(alpha-olefin)(alpha, internally unsaturated, nonconjugated olefin) by contacting the poly(alpha-olefin)(alpha, internally unsaturated, nonconjugated olefin) with an olefin containing a heteroatom containing group in the presence of a metathesis catalyst, under metathesis conditions.

12. A poly(alpha-olefin)(alpha, internally unsaturated, nonconjugated olefin) produced by any of the processes of paragraphs 1 to 11.

13. The poly(alpha-olefin)(alpha, internally unsaturated, nonconjugated olefin) of paragraph 12, wherein the poly(alpha-olefin)(alpha, internally unsaturated, nonconjugated olefin) is selected from poly(1-decene)(1,4-decadiene), poly(1-hexene)(1-decene)(1,4-decadiene), poly(1-decene)(1,4-hexadiene), poly(1-hexene)(1-decene)(1,4-hexadiene), poly(1-decene)(1,4,7-decatriene), and poly(1-hexene)(1-decene)(1,4,7-decatriene).

14. The poly(alpha-olefin)(alpha, internally unsaturated, nonconjugated olefin) of paragraphs 12 or 13, wherein the LAO-AIUNO copolymer may comprise 85 mol % of a $C_4$ to $C_{40}$ LAO and 15 mol % of an AIUNO, 75 mol % of a $C_4$ to $C_{40}$ LAO and 25 mol % of an AIUNO, 65 mol % of a $C_4$ to $C_{40}$ LAO and 35 mol % of an AIUNO, or 55 mol % of a $C_4$ to $C_{40}$ LAO and 45 mol % of an AIUNO.

15. An integrated system for the production of the poly(alpha-olefin)(alpha, internally unsaturated, nonconjugated olefin) of paragraph 13 comprising:

a. a metathesis reactor for the metathesis of a renewable feedstream to produce a mixture of linear alpha olefins and alpha, internally unsaturated, nonconjugated olefins;

b. a fractionating column for the separation of desired fractions, comprising linear alpha olefins and alpha, internally unsaturated, nonconjugated olefins, from the metathesis product mixture; and c. a polymerization reactor equipped with a metallocene catalyst system for the polymerization of linear alpha olefins and alpha, internally unsaturated, nonconjugated olefins to produce poly(alpha-olefin)(alpha, internally unsaturated, nonconjugated olefin);

wherein the components of the system are in fluid communication with each other, (and additional components may include an esterification reactor, a catalyst removal column, and a functionalization reactor).

16. The process, poly(alpha-olefin)(alpha, internally unsaturated, nonconjugated olefin), or system of any of paragraphs 1 to 15, wherein ethylene and/or propylene and/or butene and/or pentene and/or hexene is present in the copolymer at 10 wt % or less (based upon the weight of the copolymer), preferably at 9 wt %, preferably at 8 wt %, preferably at 7 wt %, preferably at 6 wt %, preferably at 5 wt %, preferably at 4 wt %, preferably at 3 wt %, preferably at 2 wt %, preferably at 1 wt %, preferably at 0 wt %.

17. The process, poly(alpha-olefin)(alpha, internally unsaturated, nonconjugated olefin), or system of any of paragraphs 1 to 15, wherein $C_2$ to $C_4$, or $C_2$ to $C_5$, or $C_2$ to $C_6$, or $C_2$ to $C_7$, or $C_2$ to $C_8$ α-olefins are present in the copolymer at 10 wt % or less (based on the weight of the copolymer), preferably less than 9 wt %, preferably less than 8 wt %, preferably less than 7 wt %, preferably less than 6 wt %, preferably less than 5 wt %, preferably less than 4 wt %, preferably less than 3 wt %, preferably less than 2 wt %, preferably less than 1 wt %, preferably 0 wt %.

18. A copolymer represented by Formula I, II, III, or IV:

where:
each $R^1$ is independently a $C_2$ to $C_{38}$ hydrocarbyl;
m is 1 to 10,000;
n is 1 to 10,000;
p is 1 to 40;
q is 0 to 40; and
r is 0 to 40.

19. The copolymer of, or produced by, any of paragraphs 1-18, wherein the copolymer has an Mn of from 100 (preferably 300, preferably 500, preferably 1,000) to 30,000 g/mol.

20. The copolymer of, or produced by, any of paragraphs 1-19 (especially paragraph 19), wherein the copolymer has a viscosity index of 120 or more, a $KV_{100}$ of 4 cSt or more, a pour point of −10° C. or less, and a specific gravity of 0.86 or less.

Experimental Section

Anhydrous toluene, dichloromethane, methyl linoleate, methyl oleate, and pentane were purchased from Sigma-Aldrich (St. Louis, Mo.) and dried over calcined alumina beads. rac-dimethyl-silyl-bis(indenyl)zirconium dimethyl was purchased from Witco Chemical Corporation and was used as received. [2-(i-propoxy)-5-(N,N-dimethylaminosulfonyl)phenyl]methylene}(tricyclohexylphosphine)ruthenium(II) dichloride was purchased from Strem Chemicals (Newburyport, Mass.) and was used as received. All other reagents were purchased from Sigma-Aldrich and dried over calcined alumina beads, unless otherwise noted.

Tests and Methods $^1$H NMR spectroscopy was recorded on a Bruker 500 MHz Varian pulsed fourier transform NMR spectrometer equipped with a variable temperature proton detection probe operating at 120° C. The polymer sample was dissolved in 1,1,2,2-tetrachloroethane-$d_2$ (TCE-$d_2$) and transferred into a 5 mm glass NMR tube. Acquisition parameters were SW=10 KHz, pulse width=30 degrees, acquisition time=2 s, acquisition delay=5 s, and number of scans=120. Chemical shifts were determined relative to the TCE-$d_2$ signal which was set to 5.98 ppm. The vinyl resonances of interest were between from 4.95 to 5.10 ppm (VRA), the vinylidene resonances between from 4.65 to 4.85 ppm (VDRA), the vinylene resonances from 5.31 to 5.55 ppm (VLA), the trisubstituted olefins from 5.11 to 5.30 ppm (TRI), and the aliphatic region of interest between from 0.00 to 2.10 ppm (IA).

The number of vinyl groups/1000 carbons was determined from the formula: (VRA×1000)/(IA+VRA+VDRA+VLA+2×TRI). Likewise, the number of vinylidene groups/1000 carbons was determined from the formula: (VDRA×1000)/(IA+VRA+VDRA+VLA+2×TRI), the number of vinylene groups per 1000 carbons was determined from the formula: (VLA×1000)/(IA+VRA+VDRA+VLA+2×TRI) and the number of trisubstituted olefinic groups per 1000 carbons was calculated from (TRI×1000)/(IA+VRA+VDRA+VLA+2×TRI). VRA, VDRA, VLA, TRI, and IA are the integrated normalized signal intensities in the chemical shift regions, as defined above.

The amount of unsaturated chains present in the LAO-AIUNO copolymer, expressed in mol %, may be determined from the formula: [(vinyls/1000 carbons)×(molecular weight of diene)/14000]×100. Yields of metathesis product were calculated from data recorded on an Agilent 6890 GC spectrometer.

EXAMPLES

Example 1

Olefin Mixture Containing 1-decene and 1,4-decadiene Produced by Ethenolysis of Methyl Linoleate and Methyl Oleate Mixture A mixture of methyl linoleate (400 mL, 1210 mmol) and methyl oleate (100 mL, 295 mmol), which had been stored over calcined alumina beads, was loaded into a 2 L stainless steel reactor. The mixture and the reactor were deoxygenated by several cycles of pressurizing with nitrogen (400 psi) followed by venting to atmospheric pressure. The reactor was warmed to 35° C. and then pressurized with ethylene (140 psi (965.3 kPa) overpressure). A methylene chloride (20 mL) solution of {[2-(i-propoxy)-5-(N,N-dimethylaminosulfonyl)phenyl]methylene}(tricyclohexylphosphine)ruthenium(II) dichloride (0.533 g, 0.753 mmol) was then added. The reaction was allowed to proceed for 4 hours, during which time ethylene was continually introduced to maintain a constant pressure. The reactor was then vented and ethyl vinyl ether (2 mL) was added to quench the catalyst. Silver triflate (0.46 g, 1.8 mmol) was then added and the mixture was stirred for 0.5 hours. The dark mixture was then filtered through a pad of silica gel. After sitting overnight, the solution was filtered again through neutral alumina to give a clear yellowish oil. This yellow oil was fractionally distilled under nitrogen. The fraction that distilled over between 80-170° C. (34.4 g) was largely a mixture of $C_7$ and $C_{10}$ olefins. This fraction was fractionally distilled again, with the fraction distilling over at 155-160° C. isolated. This distillation was repeated a third time to yield 25 g of a sample that contained approximately 70 mol % 1-decene and 30 mol % 1,4-decadiene, as determined by analysis by gas chromatography.

Example 2

Polymerization of an Olefin Mixture of 1-decene and 1,4-decadiene

To a 20 ml scintillation vial was added 2.0 g of the distilled mixture of 1-decene and 1,4-decadiene produced from the ethenolysis of methyl oleate and methyl linoleate in Example 1. 500 mg of a toluene solution (10 mL) of rac-dimethyl-silyl-bis(indenyl)zirconium dimethyl (10 mg, 0.023 mmol) activated with N,N-dimethylanilinium tetrakispentafluorophenyl borate (18 mg, 0.023 mmol) was added along with two drops of triisobutylaluminum. The mixture was heated at 100° C. with stirring for 1.5 hours. The resulting solution was then purged with nitrogen for 12 hours, yielding 0.317 g viscous liquid. The resulting copolymer contained approximately 17.4 mol % 1,4-decadiene [vinylenes/1000 carbons=17.67, trisubstituted olefins/1000 carbons=5.44, vinyls/1000 carbons=4.68, vinylidenes/1000 carbons=5.21], as determined by $^1$H NMR.

Example 3

Polymerization of an Olefin Mixture of 1-Decene and 1,4-hexadiene

A mixture of 5.0 g of 1-decene and 1.0 g of 1,4-hexadiene was loaded into a 20 mL scintillation vial. Next 200 mg of a toluene solution (10 mL) of rac-dimethyl-silyl-bis(indenyl)zirconium dimethyl catalyst (10 mg, 0.023 mmol) activated with N,N-dimethylanilinium tetrakispentafluorophenyl borate (18 mg, 0.023 mmol) was added along with two drops of triisobutylaluminum. The reaction mixture was heated at 100° C. with stirring for 1.5 hours. The resulting solution was then purged with nitrogen for 12 hours, yielding 1.17 g of a viscous liquid. The resulting copolymer contained approximately 10.5 mol % 1,4-hexadiene [vinylenes/1000 carbons=17.86, trisubstituted olefins/1000 carbons=5.71, vinylidenes/1000 carbons=5.57], as determined by $^1$H NMR.

Example 4

Polymerization of an Olefin Mixture of 1-decene and 1,4-hexadiene

In a 100 mL flask, 25.0 g of 1-decene was combined with 5.0 g 1,4-hexadiene. 1.0 g of a solution of a toluene solution (10 mL) of rac-dimethyl-silyl-bis(indenyl)zirconium dimethyl (10 mg, 0.023 mmol) activated with N,N-dimethylanilinium tetrakispentafluorophenyl borate (18 mg, 0.023 mmol) was added along with two drops of triisobutylaluminum. The mixture was heated at 100° C. with stirring for 3 hours. The resulting solution was then purged with nitrogen for 12 hours, yielding 6.35 g of a viscous liquid. The resulting copolymer contained approximately 15.3 mol % 1,4-hexadiene [vinylenes/1000 carbons=26.08, trisubstituted olefins/1000 carbons=8.14, vinylidenes/1000 carbons=4.69], as determined by $^1$H NMR.

All documents described herein are incorporated by reference herein, including any priority documents and/or testing procedures to the extent they are not inconsistent with this text, provided, however, that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise, whenever a composition, an element, or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements, and vice versa.

What is claimed is:

1. A process to produce a poly(alpha-olefin)(alpha, internally unsaturated, nonconjugated olefin) comprising:
   a. contacting at least one renewable feedstream with at least one lower olefin in the presence of a metathesis catalyst, wherein a mixture of at least one $C_4$ to $C_{40}$ linear alpha-olefin (LAO) and at least one alpha, internally unsaturated, nonconjugated olefin is produced, wherein a lower olefin is an organic compound containing at least one carbon-carbon double bond and having 4 or less carbon atoms; and
   b. contacting the mixture with a metallocene catalyst system, wherein a poly(alpha-olefin)(alpha, internally unsaturated, nonconjugated olefin) is produced.

2. The process of claim 1, wherein the at least one renewable feedstream is selected from canola oil, corn oil, soybean oil, rapeseed oil, algae oil, peanut oil, mustard oil, sunflower oil, tung oil, tall oil, perilla oil, grapeseed oil, linseed oil, safflower oil, pumpkin oil, palm oil, jatropha oil, high-oleic soybean oil, high-oleic safflower oil, high-oleic sunflower oil, mixtures of animal and vegetable fats and oils, beef tallow, castor bean oil, dehydrated castor bean oil, cucumber oil, poppyseed oil, flaxseed oil, lesquerella oil, walnut oil, cottonseed oil, meadowfoam, tuna oil, sesame oils, waste oils/greases, and mixtures thereof.

3. The process of claim 1, wherein the renewable feedstream is selected from palm oil, soybean oil, sunflower oil, canola oil, jatropha oil, and algae oil.

4. The process of claim 1, wherein the at least one lower olefin is at least one of ethylene, propylene, butene, butadiene, and isomers thereof.

5. The process of claim 1, wherein the at least one $C_4$ to $C_{40}$ linear alpha-olefin is selected from 1-butene, 1-pentene, 1-hexene, 1-heptene, 1-octene, 1-nonene, 1-decene, 1-undecene, 1-dodecene, and 1-tetradecene.

6. The process of claim 1, wherein the at least one alpha, internally unsaturated, nonconjugated olefin is selected from 1,4-hexadiene, 1,4-octadiene, 1,5-octadiene, 1,6-octadiene, 1,4-nonadiene, 1,5,-nonadiene, 1,6,-nonadiene, 1,7,-nonadiene, 1,4-decadiene, 1,5-decadiene, 1,6-decadiene, 1,7-decadiene, 1,4,7-decatriene, and 1,5,8-decatriene.

7. The process of claim 1, wherein the metathesis catalyst comprises an organometallic compound of tungsten, molybdenum, ruthenium, tantalum, or rhenium.

8. The process of claim 1, further comprising contacting the mixture with a metal salt and filtering the mixture through an adsorbant to remove the metathesis catalyst, before contacting with the metallocene catalyst system.

9. The process of claim 1, wherein the metallocene catalyst system comprises at least one activator selected from N,N-dimethylanilinium tetrakis(perfluoronapthyl)borate, N,N-dimethylanilinium tetrakis(perfluorobiphenyl)borate, N,N-dimethylanilinium tetrakis (3,5-bis(trifluoromethyl)phenyl)borate, triphenylcarbenium tetrakis(perfluoronapthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, and N,N-dimethylanilinium tetrakis(pentafluorophenyl)borate.

10. The process of claim 1, wherein the metallocene catalyst system comprises at least one co-activator selected from trimethylaluminum, triethylaluminum, triisobutylaluminum, tri-n-hexylaluminum, diethyl zinc, and tri-n-octylaluminum.

11. The process of claim 1, wherein the metallocene catalyst system comprises at least one metallocene catalyst of the formula,

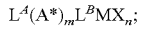

wherein M is zirconium, hafnium, or titanium;
$L^A$ and $L^B$, are cyclopentadienyl, substituted cyclopentadienyl, indenyl, substituted indenyl, fluorenyl, or substituted fluorenyl ligands;
each X is independently a monoanionic ligand selected from one of hydride; substituted or unsubstituted $C_1$ to $C_{30}$ hydrocarbyl; alkoxide; aryloxide; amide; halide; phosphide; and Group 14 organometalloids; or both Xs together may form an alkylidene or a cyclometallated hydrocarbyl or other dianionic ligand;
A* is a bridging group;
m is 0 or 1; and
n is 0, 1, or 2.

12. The process of claim 11, wherein the metallocene is selected from rac-dimethyl-silyl-bis(4,5,6,7-tetrahydroindenyl)zirconium dichloride, rac-dimethyl-silyl-bis(4,5,6,7-tetrahydroindenyl)zirconium dimethyl, rac-dimethyl-silyl-bis(indenyl)zirconium dichloride, rac-dimethyl-silyl-bis(indenyl)zirconium dimethyl, rac-ethylidene-bis(4,5,6,7-tetrahydroindenyl) zirconium dichloride, rac-ethylidene-bis(4,5,6,7-tetrahydroindenyl)zirconium dimethyl, rac-ethylidene-bis(indenyl)zirconium dichloride, rac-ethylidene-bis(indenyl)zirconium dimethyl, meso-dimethyl-silyl-bis(4,5,6,7-tetrahydroindenyl)zirconium dichloride, meso-dimethyl-silyl-bis(4,5,6,7-tetrahydroindenyl)zirconium dimethyl, meso-dimethyl-silyl-bis(indenyl)zirconium dichloride, meso-dimethyl-silyl-bis(indenyl)zirconium dimethyl, meso-ethylidene-bis(4,5,6,7-tetrahydroindenyl)zirconium dichloride, meso-ethylidene-bis(4,5,6,7-tetrahydroindenyl) zirconium dimethyl, meso-ethylidene-bis(indenyl) zirconium dichloride, meso-ethylidene-bis(indenyl) zirconium dimethyl, bis(cyclopentadienyl)zirconium dichloride, bis(cyclopentadienyl)zirconium dimethyl, bis(1,2-dimethylcyclopentadienyl)zirconium dichloride, bis(1,2-dimethylcyclopentadienyl)zirconium dimethyl, bis(1,3-dimethylcyclopentadienyl)zirconium dichloride, bis(1,3-dimethylcyclo-pentadienyl)zirconium dimethyl, bis(1,2,3-trimethylcyclopentadienyl)zirconium dichloride, bis(1,2,3-trimethylcyclopentadienyl)zirconium dimethyl, bis (trimethylcyclopentadienyl)zirconium dichloride, bis(1,2,4-trimethylcyclopentadienyl)zirconium dimethyl, bis(1,2,3,4-tetramethylcyclopentadienyl)zirconium dichloride, bis(1,2,3,4-tetramethylcyclopentadienyl) zirconium dimethyl, bis (pentamethylcyclopentadienyl)zirconium dichloride, bis (pentamethyl-cyclopentadienyl)zirconium dimethyl, bis (propylcyclopentadienyl)hafnium dichloride, and bis (propylcyclopentadienyl)hafnium dimethyl.

13. The process of claim 1, wherein the metallocene catalyst system comprises rac-dimethyl-silyl-bis(indenyl)zirconium dimethyl, N,N-dimethylanilinium tetrakis(pentafluorophenyl) borate, and alkylaluminum.

14. The process of claim 1, further comprising functionalizing the poly(alpha-olefin)(alpha, internally unsaturated, nonconjugated olefin) by contacting the poly(alpha-olefin)(alpha, internally unsaturated, nonconjugated olefin) with an olefin comprising a heteroatom containing group, in the presence of a metathesis catalyst, under metathesis conditions.

15. The process of claim 1, wherein the contacting of at least one renewable feedstream with at least one lower olefin in the presence of a metathesis catalyst, wherein a mixture of at least one $C_4$ to $C_{40}$ linear alpha-olefin and at least one alpha, internally unsaturated, nonconjugated olefin is produced, and the contacting of the mixture with a metallocene catalyst system occurs in a series of reactors.

16. The process of claim 1, wherein the LAO is a $C_6$ to $C_{40}$ LAO.

* * * * *